United States Patent
Suzuki et al.

(10) Patent No.: US 9,622,103 B2
(45) Date of Patent: Apr. 11, 2017

(54) COMMUNICATIONS NETWORK CONTROL METHOD, COMPUTER PRODUCT, AND SYSTEM

(71) Applicant: FUJITSU LIMITED, Kawasaki-shi, Kanagawa (JP)

(72) Inventors: Takahisa Suzuki, Yokohama (JP); Koichiro Yamashita, Hachioji (JP); Toshiya Otomo, Kawasaki (JP); Hiromasa Yamauchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/169,920

(22) Filed: Jun. 1, 2016

(65) Prior Publication Data
US 2016/0277955 A1 Sep. 22, 2016

Related U.S. Application Data

(63) Continuation of application No. PCT/JP2013/082396, filed on Dec. 2, 2013.

(51) Int. Cl.
*H04W 24/10* (2009.01)
*H04W 16/00* (2009.01)
(Continued)

(52) U.S. Cl.
CPC .......... *H04W 24/10* (2013.01); *H04W 16/00* (2013.01); *H04W 48/16* (2013.01); *H04W 84/18* (2013.01)

(58) Field of Classification Search
CPC ............... H04W 24/10; H04L 45/20
(Continued)

(56) References Cited

U.S. PATENT DOCUMENTS

2003/0202465 A1* 10/2003 Cain ............ H04L 45/04 370/225
2006/0067232 A1* 3/2006 Lee ............ H04L 45/122 370/235
(Continued)

FOREIGN PATENT DOCUMENTS

JP 2005-524337 8/2005
JP 2006-94527 4/2006
(Continued)

OTHER PUBLICATIONS

International Search Report, mailed in connection with PCT/JP2013/082396 and mailed Jan. 14, 2014 (1 page).

*Primary Examiner* — John J Lee
(74) *Attorney, Agent, or Firm* — Fujitsu Patent Center

(57) ABSTRACT

A communications network control method by a computer includes obtaining measurement area information indicating a measurement area of a sensor included in a communications node, the computer obtaining the measurement area information for each communications node in a communications node group that is included in a communications network and that is among plural communications nodes arranged in an arrangement area; obtaining divided area information indicating plural divided areas obtained by dividing the arrangement area; deriving for each divided area among the plural divided areas, a first value corresponding to a count of communications nodes that are in the communications node group and at least partially include the divided area in the measurement area indicated by the obtained measurement area information; and providing control of changing among the plural communications nodes, communications nodes included in the communications network, according to the first value derived for each divided area.

14 Claims, 28 Drawing Sheets

(51) Int. Cl.
*H04W 48/16* (2009.01)
*H04W 84/18* (2009.01)

(58) Field of Classification Search
USPC ........ 455/456.1, 452.1, 509, 453, 446, 67.11
See application file for complete search history.

(56) References Cited

U.S. PATENT DOCUMENTS

| 2013/0176433 A1* | 7/2013 | Terada | G06Q 30/02 |
| | | | 348/143 |
| 2016/0142679 A1* | 5/2016 | Miyoshi | H04N 7/18 |
| | | | 348/159 |

FOREIGN PATENT DOCUMENTS

| JP | 2007-36361 | 2/2007 |
| JP | 2009-250627 | 10/2009 |
| JP | 2010-045720 | 2/2010 |
| JP | 2010-233011 | 10/2010 |

* cited by examiner

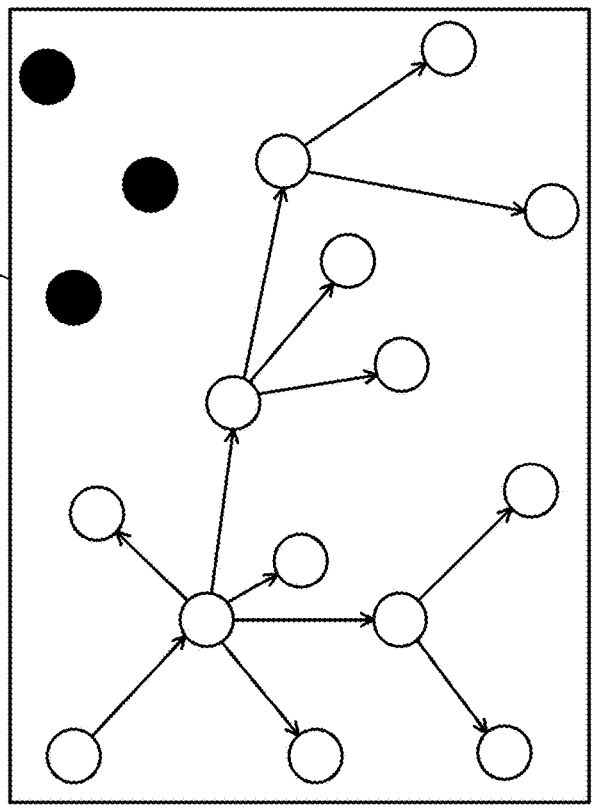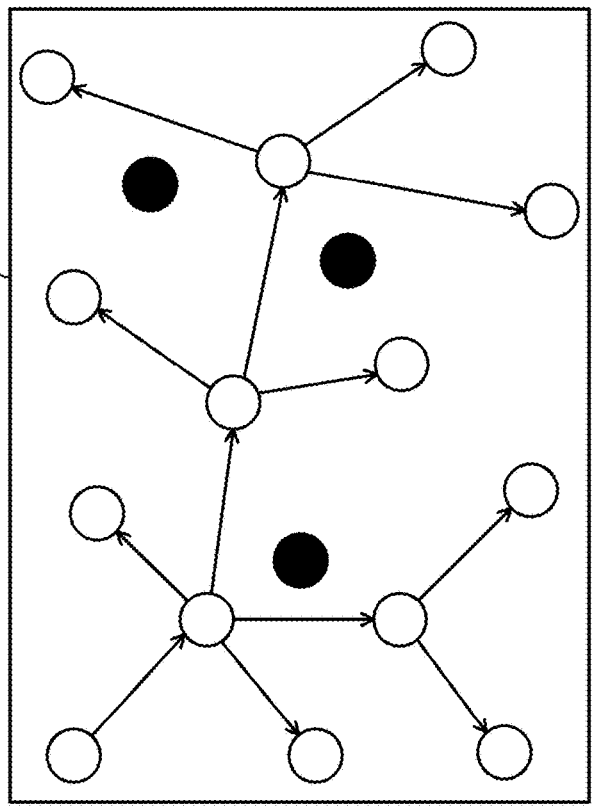

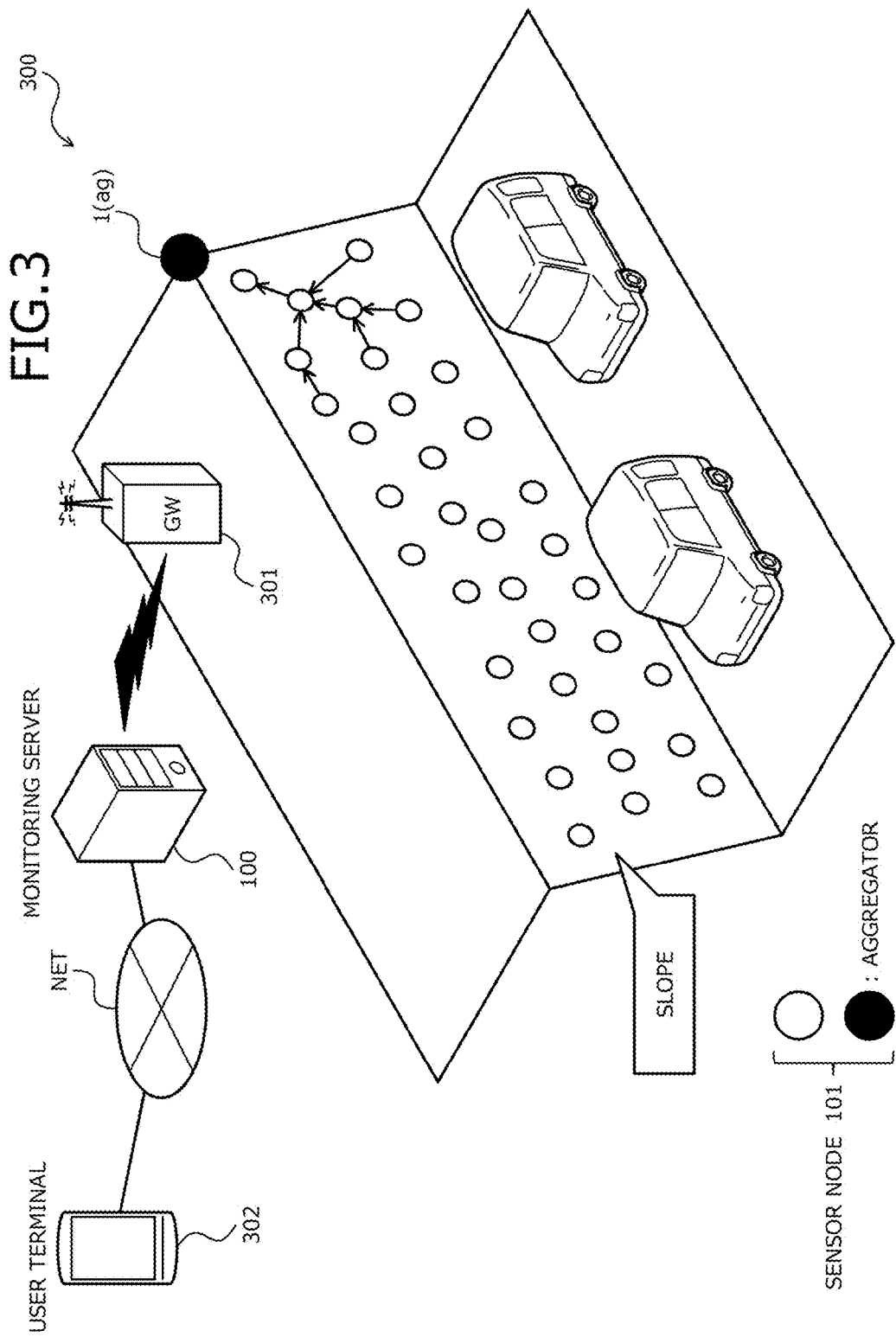

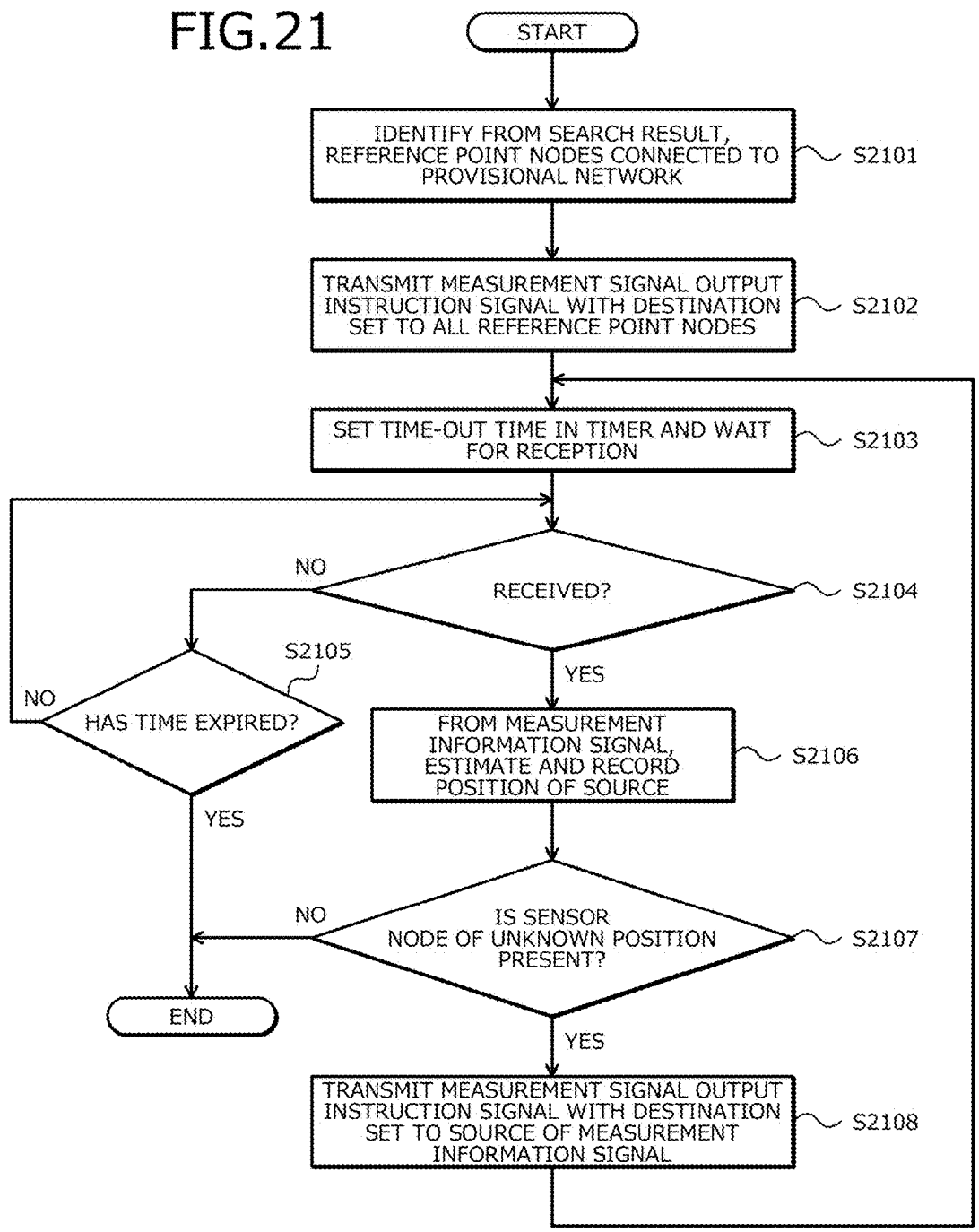

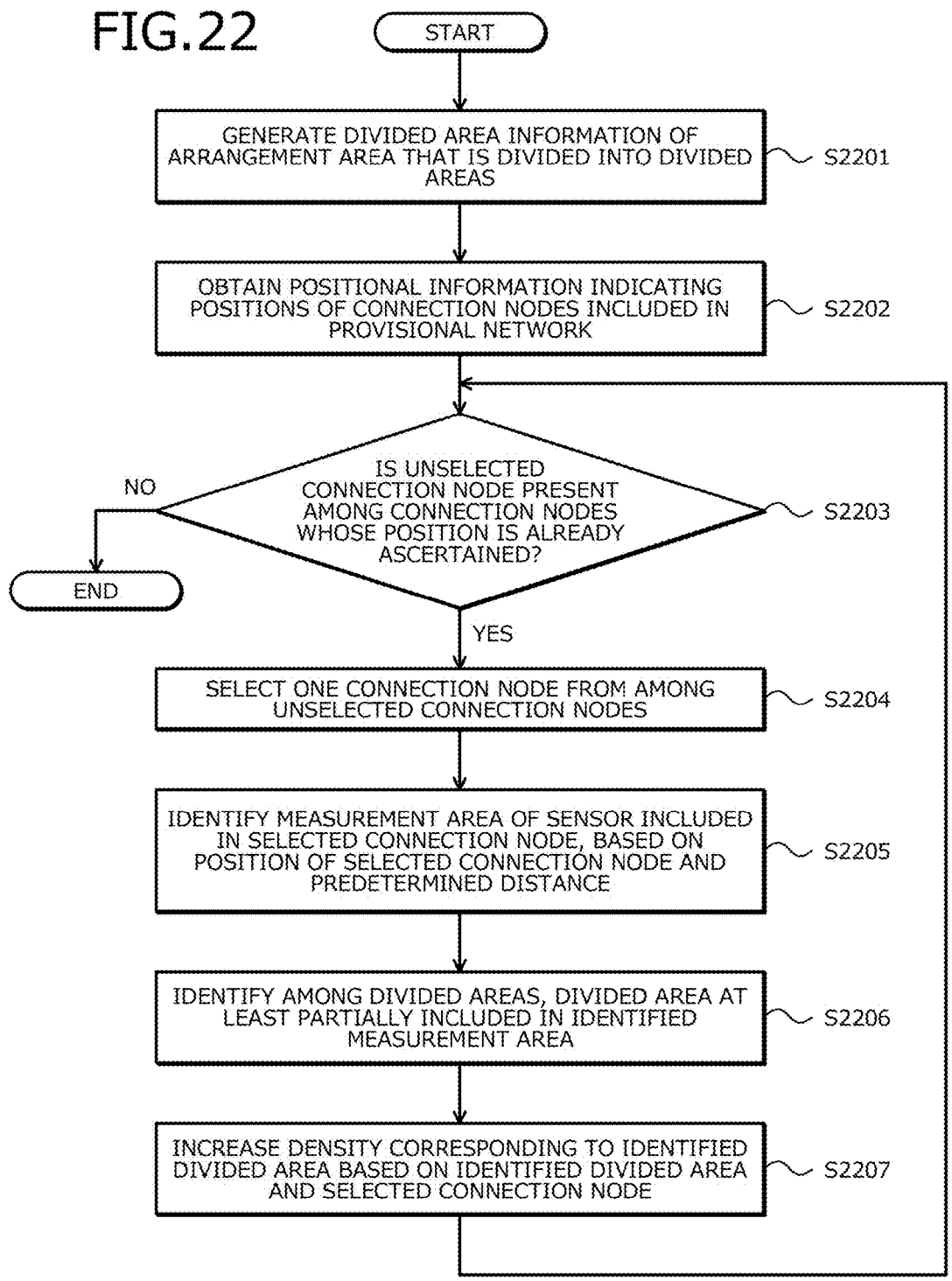

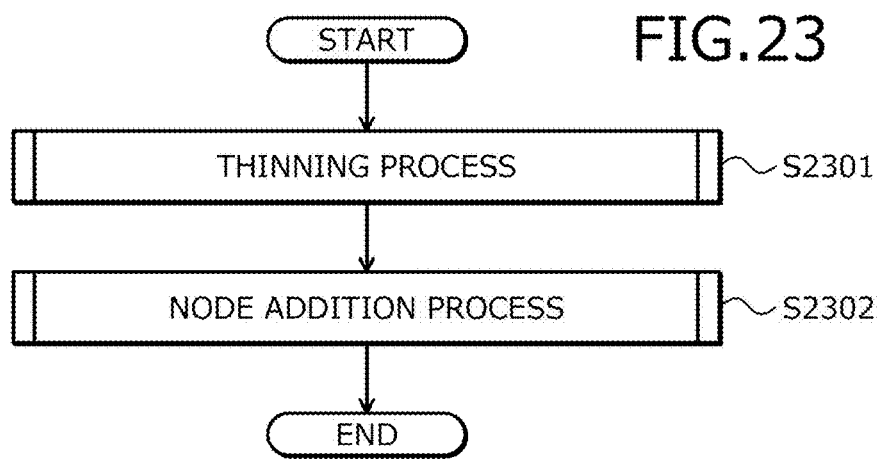
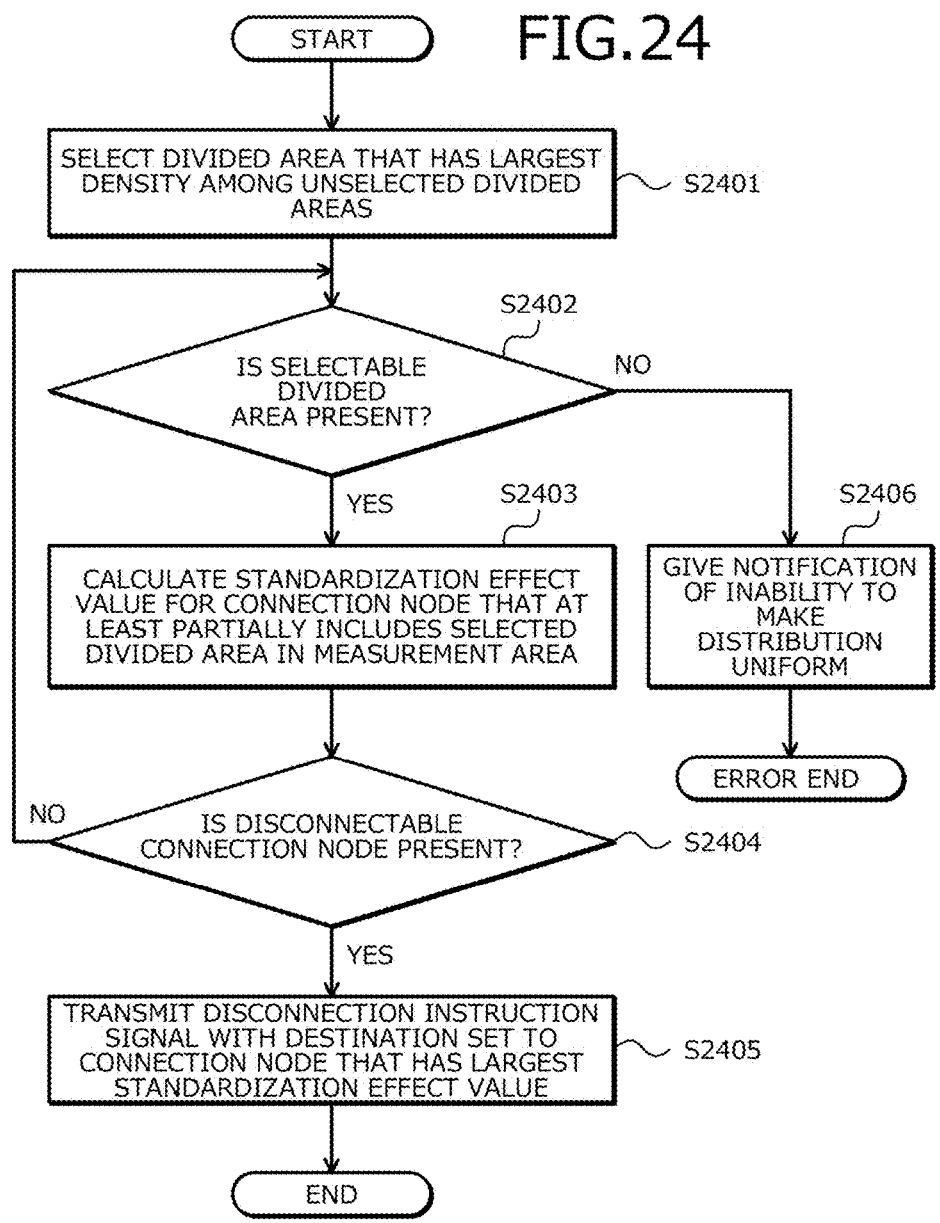

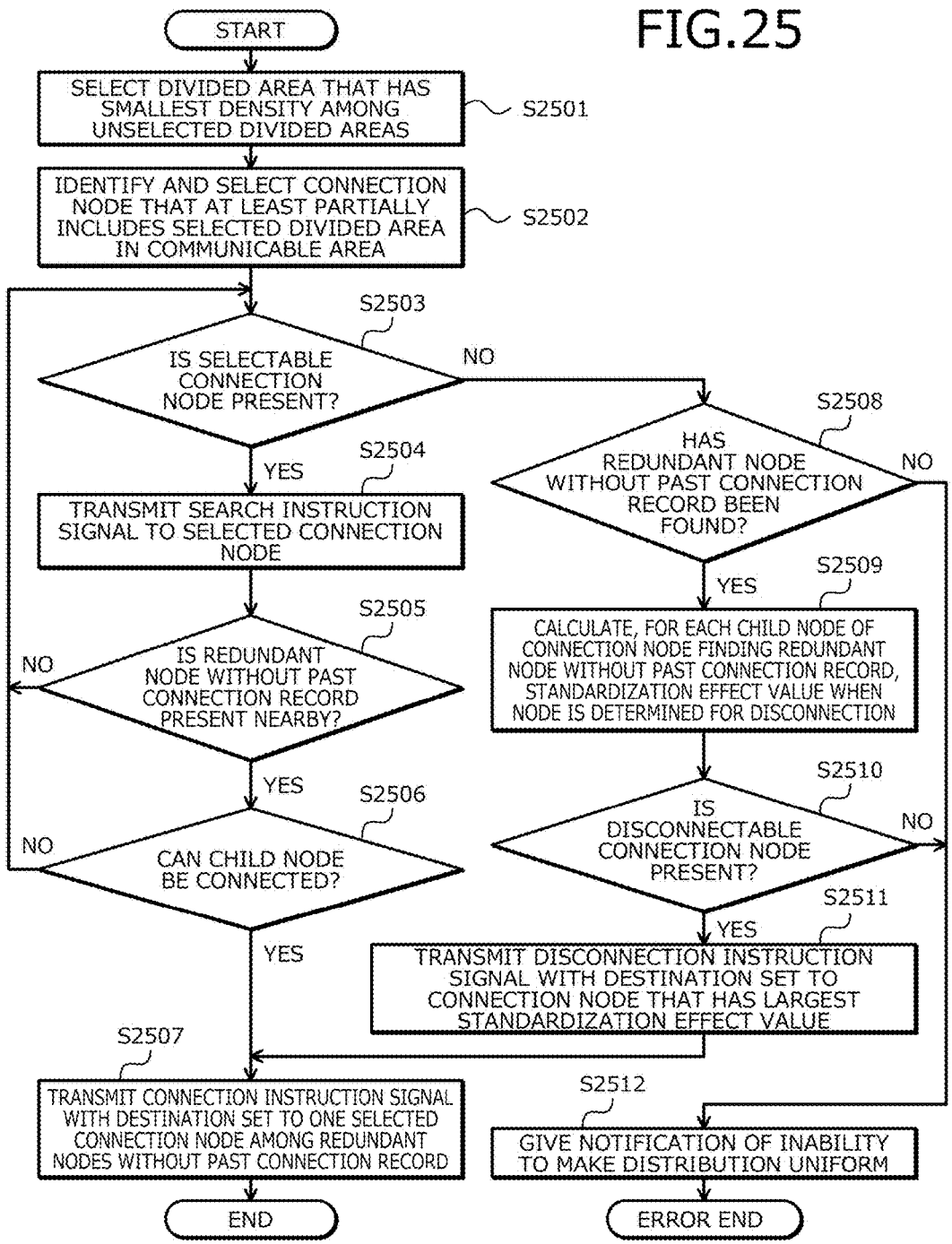

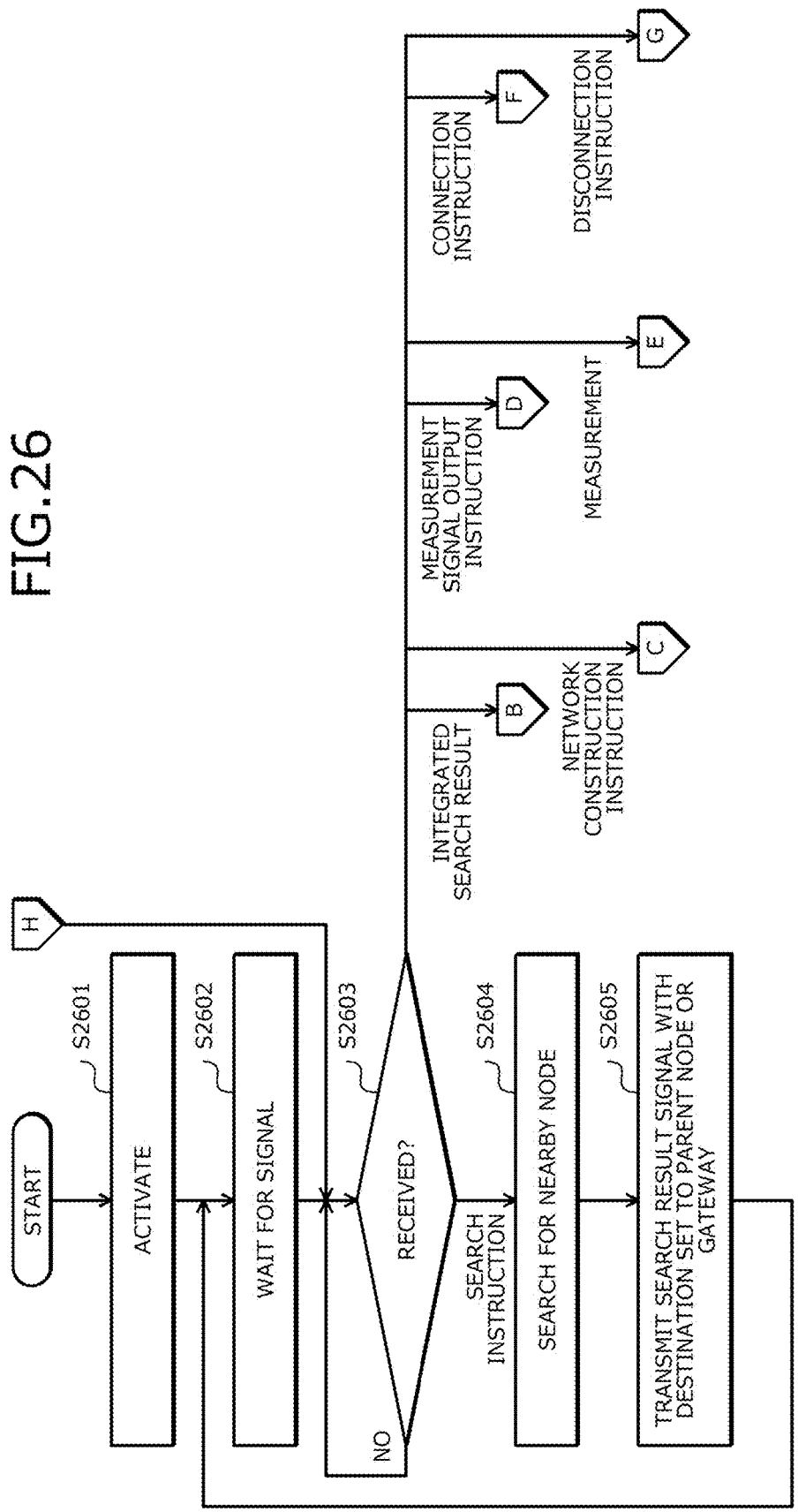

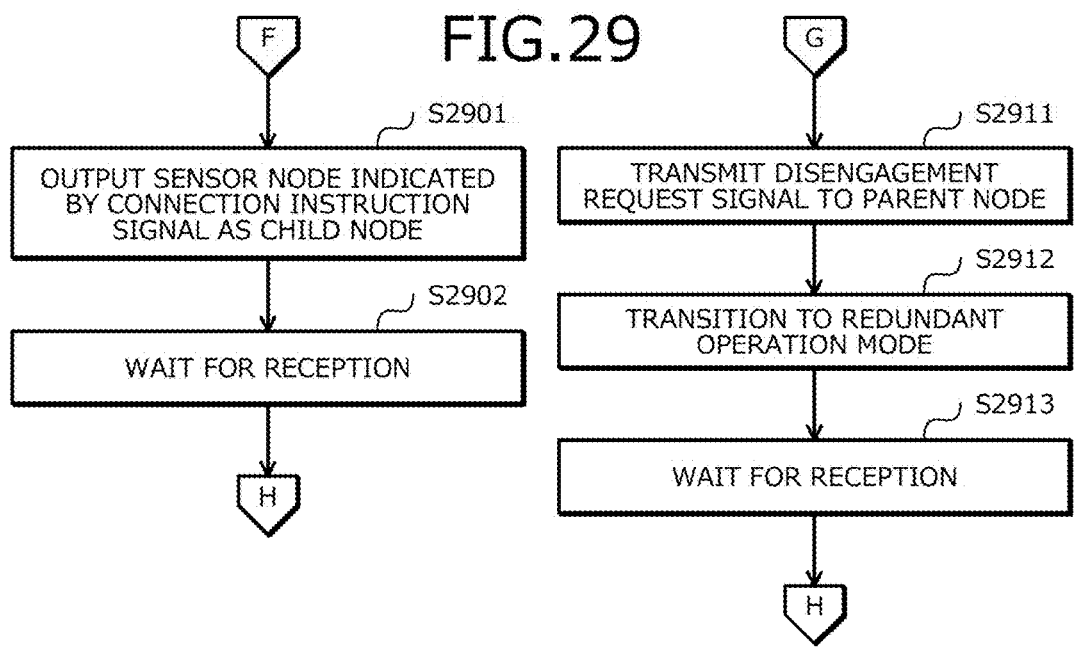

COMMUNICATIONS NETWORK CONTROL METHOD, COMPUTER PRODUCT, AND SYSTEM

CROSS REFERENCE TO RELATED APPLICATIONS

This application is a continuation application of International Application PCT/JP2013/082396, filed on Dec. 2, 2013 and designating the U.S., the entire contents of which are incorporated herein by reference.

FIELD

The embodiments discussed herein relate to a communications network control method, a computer product, and a system.

BACKGROUND

Techniques of constructing a network from multiple wirelessly connectable communications nodes are conventionally known. For example, in a known technique, when a packet is sent from a source node to a destination node through a predetermined communication path, a communication path is set for the respective nodes having the smallest and the largest hop count from the source node, among intermediate nodes on the predetermined communication path (see, e.g., Japanese Laid-Open Patent Publication No. 2006-94527). For example, when multiple wirelessly connectable nodes are disposed, neighboring nodes are detected to form clusters and neighboring clusters are connected to construct a network in a known technique (see, e.g., Japanese Laid-Open Patent Publication No. 2007-36361). For example, when multiple nodes are grouped into clusters and multiple wireless links are connected to the multiple nodes, a route from a source node to a target node is determined in a known technique (see, e.g., Published Japanese-Translation of PCT Application, Publication No. 2005-524337).

For example, in a network of wirelessly communicating sensors, two sensors, a first and a second reference sensor, at preliminarily known positions are used for measuring a sensor position of a third object sensor based on information of distances from the two reference sensors in a known technique (see, e.g., Japanese Laid-Open Patent Publication No. 2009-250627).

Nonetheless, when some of the arranged communications nodes are used as redundant nodes not included in a network, non-uniform distribution of the redundant nodes causes a problem of inability to improve the reliability of the network.

SUMMARY

According to an aspect of an embodiment, a communications network control method includes obtaining by a computer, measurement area information indicating a measurement area of a sensor included in a communications node, the computer obtaining the measurement area information for each communications node in a communications node group that is included in a communications network and that is among plural communications nodes arranged in an arrangement area; obtaining by the computer, divided area information indicating plural divided areas obtained by dividing the arrangement area; deriving by the computer and for each divided area among the plural divided areas indicated by the obtained divided area information, a first value corresponding to a count of communications nodes that are in the communications node group and at least partially include the divided area in the measurement area indicated by the obtained measurement area information; and providing by the computer, control of changing among the plural communications nodes, communications nodes included in the communications network, according to the first value derived for each divided area among the plural divided areas.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2A and 2B are explanatory views of a biased example of redundant nodes rnd;

FIG. 3 is an explanatory diagram of a usage example of a system according to the present invention;

FIG. 21 is a flowchart of an example of a position measurement process procedure of the monitoring server 100;

FIG. 22 is a flowchart of an example of a distribution density analysis process procedure of the monitoring server 100;

FIG. 23 is a flowchart of a density difference elimination process procedure of the monitoring server 100;

FIG. 24 is a flowchart of an example of a thinning process procedure of the monitoring server 100;

FIG. 25 is a flowchart of an example a node addition process procedure of the monitoring server 100; and FIGS. 26, 27, 28, and 29 are flowcharts of an example of the process procedure of the sensor node 101.

DESCRIPTION OF EMBODIMENTS

Embodiments of a communications network control method, a communications network control program, a system, and a recording medium according to the present invention will be described in detail with reference to the accompanying drawings.

Figure 1:
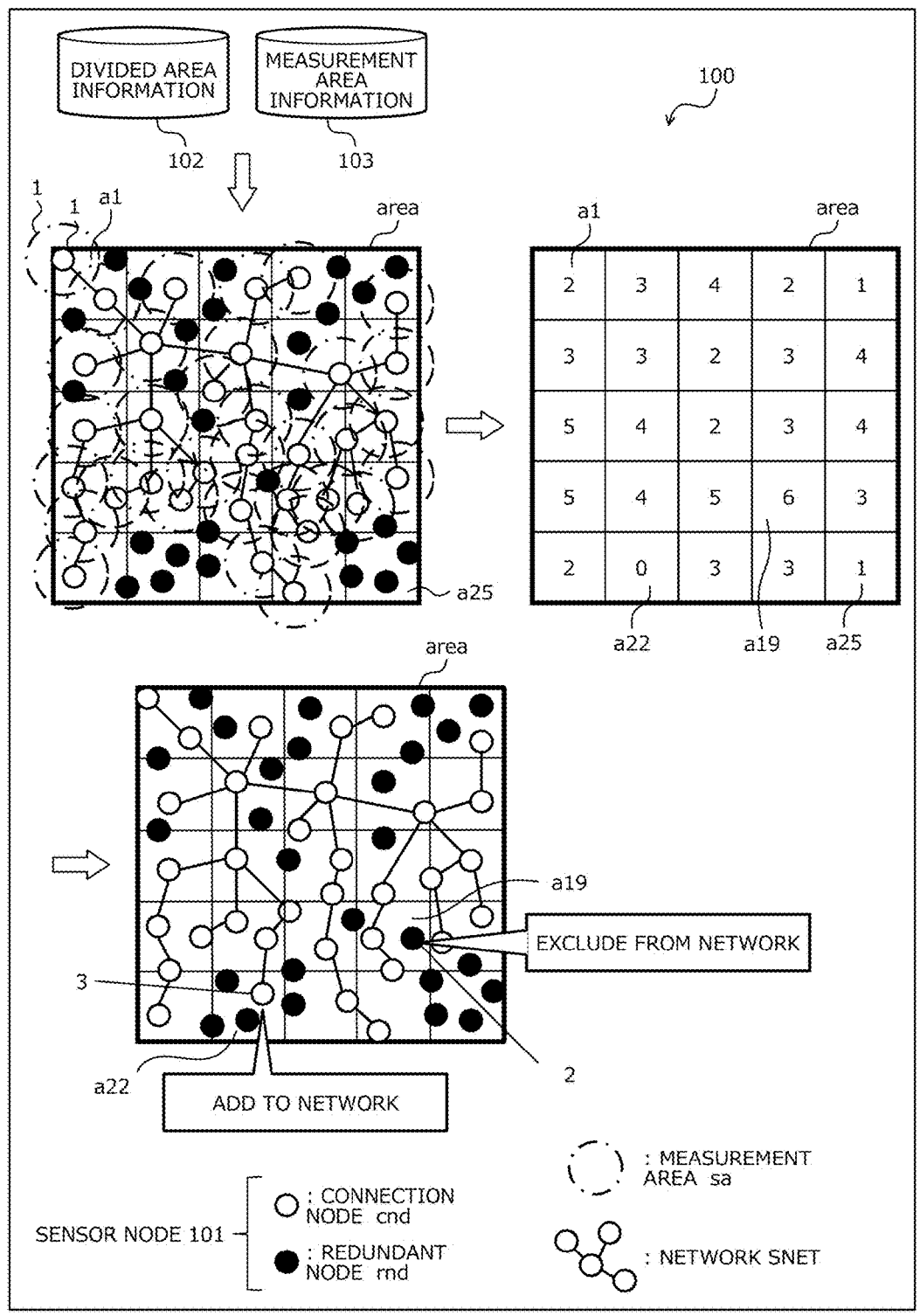
FIG. 1 is an explanatory view of an operation example of a monitoring server according to the present invention.

FIG. 1 is an explanatory view of an operation example of a monitoring server according to the present invention. A monitoring server 100 is a computer configured to control the construction of a network SNET from sensor nodes 101 arranged in an arrangement area (area) and is a communications apparatus configured to communicate with the sensor nodes 101. The sensor nodes 101 are communications nodes having a sensor and a small radio communications circuit. The sensor nodes 101 communicate with each other to form a communications network. The communications network is referred to as a network SNET.

Some of the sensor nodes 101 arranged in the arrangement area (area) are included in the network SNET and the remaining sensor nodes 101 are not included in the network SNET. The sensor nodes 101 included in the network SNET are also referred to as connection nodes cnd. Among the multiple sensor nodes 101, sensor nodes 101 other than the connection nodes cnd are also referred to as redundant nodes rnd. Although the network SNET is constructed by the monitoring server 100 described in a detailed example hereinafter, the network SNET is already constructed in FIG. 1. Although the connection nodes cnd are connected through lines in FIG. 1, the connection nodes cnd are actually connected through wireless communications as described above.

During operation of a system, the connection nodes cnd perform a measurement operation by the sensor, a transmission operation for data obtained by the measurement operation, a transfer operation for data from other connection nodes cnd, etc., while the redundant nodes rnd do not perform the measurement operation, the data transfer operation, etc. Thus, the redundant nodes rnd are less degraded over time as compared to the connection nodes cnd. For example, if a connection node cnd is operated for a long period and fails due to aging, degradation, etc., and a redundant node rnd near the failed connection node cnd is newly added to the network SNET whereby, the measurement operation in the arrangement area (area) can be performed long term. Thus, the reliability of the system can be improved.

However, if no redundant node rnd is present near the failed connection node cnd, the area around the failed connection node cnd is not measured in the arrangement area (area). Therefore, when some of the sensor nodes 101 are used as the redundant nodes rnd, the reliability is reduced unless the redundant nodes rnd are uniformly arranged even when the multiple sensor nodes 101 are uniformly arranged in the arrangement area (area).

Thus, in the present embodiment, each divided area a of the arrangement area (area) is analyzed in terms of the number of the connection nodes cnd whose measurement area sa at least partially includes the divided area a, and the connection nodes cnd of the network SNET is changed according to the analysis result. As a result, the redundant nodes rnd can be distributed uniformly and the reliability can be improved.

First, for each of the connection nodes cnd included in the network SNET, the monitoring server 100 acquires measurement area information 103 that indicates the measurement area sa of a sensor included in the communications node. For example, the measurement area sa of a sensor node 101-1 is a measurement area sa-1. The measurement area sa is represented by the position of the sensor node 101 and a measurable distance of the sensor included in the sensor node 101. For example, the position of the sensor node 101 may be latitude and longitude or may be a relative position in the arrangement area (area). A relative position in the arrangement area (area) is, for example, coordinates based on axes defined in a simulation space simulating the arrangement area (area). For example, if the arrangement area (area) has a square shape as depicted in FIG. 1, the coordinates may be acquired by using the lower left corner as the origin. With regard to a method of acquiring the measurement area information 103, for example, the monitoring server 100 transmits a signal giving an instruction for measuring position to the sensor nodes 101 when constructing a provisional network SNET, thereby acquiring the positions of the sensor nodes 101 as response signals to the signal. If the distance between a source and a destination is not within a directly communicable distance of a signal, the signal is sent from the source to the destination through relay transfer utilizing multihop communication.

The monitoring server 100 then acquires divided area information 102 indicating the divided areas a obtained by dividing the arrangement area (area). In this case, the monitoring server 100 does not physically divide the arrangement area (area). The monitoring server 100 divides the arrangement area (area) into the divided areas a in a simulation space simulating the arrangement area (area) to generate the divided area information 102 indicating the divided areas a and thereby acquires the divided area information 102. The divided area information 102 may be represented by latitude and longitude or may be coordinates based on axes defined in the simulation space as is the case with the positions of the sensor nodes 101. For example, the monitoring server 100 divides the arrangement area (area) into a predetermined size. The predetermined size is defined in advance by a developer. When the predetermined size is smaller, a density described later can be identified in more detail. In this example, the arrangement area (area) is divided into 25 divided areas a, from a1 to a25. In FIG. 1, some of reference numerals a1 to a25 are not depicted.

For each of the divided areas a indicated by the divided area information 102, the monitoring server 100 derives a value corresponding to the number of the connection nodes cnd at least partially including the divided area a in the measurement areas sa indicated by the acquired measurement area information 103, among the connection nodes cnd. The derived value is also referred to as a density. As a result, the distribution density of the arrangement area (area) can be identified. For example, when the density corresponding to the divided area a is a larger value, the density is higher and the number of connection nodes cnd at least partially including the divided area a in the measurement areas sa is larger. In contrast, when the density corresponding to the divided area a is a smaller value, the density is lower and the number of connection nodes cnd at least partially including the divided area a in the measurement areas sa is smaller. In the example depicted in FIG. 1, the density of the divided area a22 is the lowest and the density of the divided area a19 is the highest. Although the density is the number of connection nodes cnd at least partially including the divided area a in the measurement areas sa thereof in the example of FIG. 1, the monitoring server 100 may change the amount of increase of the density based on a degree of overlap between the measurement areas sa and the divided area a.

The monitoring server 100 then provides control of changing the communications nodes included in the network SNET according to the density derived for each of the divided areas a. For example, a divided area a having a lower density is likely to have a larger number of redundant nodes rnd. In other words, a divided area a having a lower density is likely to have a smaller number of connection nodes cnd. Therefore, measurement is not likely to be performed in the divided area a under the current circumstances. Thus, among the redundant nodes rnd, the monitoring server 100 adds to the network SNET, a redundant node rnd that at least partially includes in the measurement area sa of the sensor included in the redundant node rnd, a divided area a selected from among the divided areas a, based on the derived density. For example, the selected divided area a may be the divided area a that has the lowest density. Alternatively, for example, the monitoring server 100 selects a divided area a that has a derived density that does not satisfy a predetermined condition, among the divided areas a. The predetermined condition may be a density larger than a threshold value or a density for which difference with the average density less than a certain value. Therefore, for example, the selected divided area a may be a divided area a that has a density equal to or less than the threshold value or may be a divided area that has a density that is greater than or less the average density by the certain value. The threshold value and the certain value are values defined by the developer.

In this description, addition to the network SNET is also referred to as connection to the network SNET. For example, the monitoring server 100 transmits a signal giving an instruction for connection to the network SNET, to a redundant node rnd that at least partially includes the selected divided area a in the of the sensor, i.e., a redundant node rnd whose measurement area sa at least partially includes the selected divided area a. As a result, when the redundant node rnd receives the signal, the redundant node rnd can be added to the network SNET. Details such as which redundant node rnd is added will be described later. In the example depicted in FIG. 1, the divided area a22 is the divided area that has the lowest density and therefore, a sensor node 101-3 is added to the network SNET.

For example, a divided area a having a higher density is likely to have a smaller number of redundant nodes rnd. Therefore, no redundant node rnd can be added at the time of failure of a connection node cnd that partially includes the divided area a in the measurement area sa. Thus, for example, the monitoring server 100 excludes from the network SNET, any of the connection nodes cnd that at least partially include in the measurement areas sa, the divided area a selected based on the derived density from among the divided areas a. For example, the selected divided area a may be the divided area a that has the largest derived density among the divided areas a, may be a divided area a that has a density larger than a threshold value, or may be a divided area a that has a density greater than the average density by a certain value or more. The threshold value and the certain value are values defined by the developer.

In this description, exclusion from the network SNET is also referred to as disconnection from the network SNET. For example, the monitoring server 100 transmits to a connection nodes cnd, a signal giving an instruction for disconnection from the network SNET. The connection node cnd receives the signal and is excluded from the network SNET, becoming a redundant node rnd. Details such as which connection node cnd is disconnected will be described later. In the example depicted in FIG. 1, the divided area a19 is the divided area that has the highest density and therefore, the sensor node 101-2 is excluded from the network SNET.

For example, the number of the connection nodes cnd is defined as a prescribed number, and the process of connection to the network SNET and the process of disconnection from the network SNET are executed such that the number of the connection nodes cnd does not exceed the prescribed number. As a result, the number of the redundant nodes rnd can be restrained from becoming excessively large or small, so that the redundant nodes rnd are uniformly arranged in the arrangement area (area).

FIGS. 2A and 2B are explanatory views of a biased example of the redundant nodes rnd. FIG. 2A depicts an example of the connection nodes cnd uniformly distributed in the arrangement area (area). In contrast, FIG. 2B depicts an example of the connection nodes cnd not uniformly distributed in the arrangement area (area). As depicted in FIG. 2B, the measurement by the sensors cannot be performed in an area where the redundant nodes rnd are arranged in a concentrated manner in the arrangement area (area). Additionally, if the number of the connection nodes cnd constructing the network SNET is fixed, no redundant node rnd may replace a failed connection node cnd in an area having a small number of redundant nodes rnd and connection nodes cnd arranged in a concentrated manner. Therefore, as depicted in FIG. 2A, the connection nodes cnd and the redundant nodes rnd are uniformly arranged. Thus, according to a communications network control process by the monitoring server 100 described with reference to FIG. 1, the redundant nodes rnd can be distributed uniformly.

FIG. 3 is an explanatory diagram of a usage example of a system according to the present invention. A system 300 is a sensor network system that includes the sensor nodes 101 that communicate with each other to form the network SNET and enable data of sensors to be collected. The system 300 includes the sensor nodes 101 and the monitoring server 100. For example, the system 300 depicted in FIG. 3 includes the sensor nodes 101 disposed in an arrangement area (area) such as a slope to monitor collapse of the slope with the sensors included in the sensor nodes 101. The sensor nodes 101 may be disposed in an arrangement area (area) of an agricultural field, a building, etc., an arrangement area (area) filled with a substance such as concrete, soil, water, and air. The sensors included in the sensor nodes 101 may measure temperature, moisture amount, or vibration, for example. A management server wirelessly communicates with the sensor nodes 101 via a gateway 301 and an aggregator ag, for example. The aggregator ag may be a sensor node 101 included among the sensor nodes 101. In the example depicted in FIG. 3, the aggregator ag is the sensor node 101-1. The gateway 301 transmits a signal from the monitoring server 100 to the aggregator ag and transmits a signal from the aggregator ag to the monitoring server 100.

In this embodiment, the sensor nodes 101 may include an extremely small number of the sensor nodes 101 that can measure a position by the sensors thereof such as GPS or that have positional information registered by the developer of the system 300. The monitoring server 100 may measure the positions of the connection nodes cnd by using the positional information that indicates the positions of some of the sensor nodes 101 described above. A detailed measurement example will be described later. The sensor nodes 101 at the positions identified by the monitoring server 100 may also referred to as reference point nodes.

Figure 4:
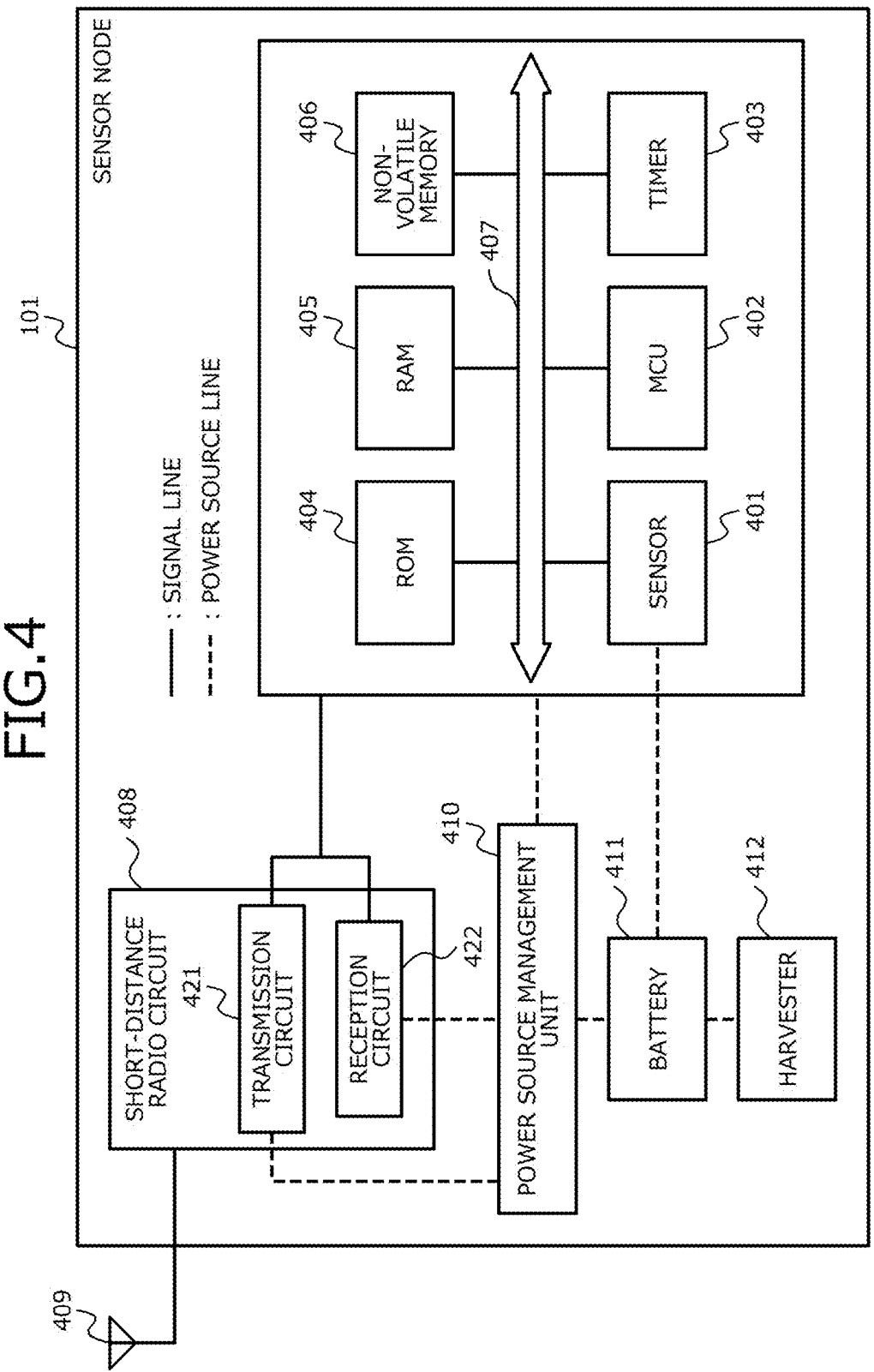
FIG. 4 is a block diagram of a hardware configuration example of sensor nodes 101.

FIG. 4 is a block diagram of a hardware configuration example of the sensor nodes 101. Each of the sensor nodes 101 has a sensor 401, a micro control unit (MCU) 402, a timer 403, read only memory (ROM) 404, random access memory (RAM) 405, and non-volatile memory 406. The sensor node 101 also has a short-distance radio circuit 408, an antenna 409, a power source management unit 410, a battery 411, a harvester 412, etc. The sensor node 101 also has an internal bus 407 connecting the sensor 401, the MCU 402, the timer 403, the ROM 404, the RAM 405, and the non-volatile memory 406. In FIG. 4, dotted lines indicate power source lines and solid lines indicate signal lines.

The sensor 401 detects a predetermined change at the installation site. For example, the sensor 401 can be a piezoelectric element that detects a pressure at the installation site, an element that detects temperature, or a photoelectric element that detects light. As described above, an area measurable by the sensor 401 is the measurement area sa. The measurement area sa is an area within a predetermined distance from the position of the sensor node 101. The predetermined distance differs according to the type and performance of the sensor 401.

The antenna 409 transmits radio waves for communication with the other sensor nodes 101 and the gateway 301. For example, the short-distance radio circuit 408 uses radio frequency (RF). The short-distance radio circuit 408 has a reception circuit 422 that outputs radio waves received via the antenna 409 as a reception signal and a transmission circuit 421 that transmits a transmission signal as radio waves via the antenna 409. The transmission circuit 421 may have a transmission power that can be changed by the MCU 402. In this embodiment, for example, the transmission power of the transmission circuit 421 is set such that a signal can reach a predefined distance.

The MCU 402 is a control unit that loads a program stored in the ROM 404 to the RAM 405 and executes the program to provide overall control and execute data processing of the sensor node 101, for example. For example, the MCU 402 processes data obtained by the sensor 401. The timer 403 counts a time set in the MCU 402, for example. In this embodiment, for example, the timer 403 counts a sensing interval for autonomous sensing by the sensor 401. Additionally, for example, the timer 403 may count a predetermined period for stopping the short-distance radio circuit 408.

The ROM 404 is a storage unit that stores therein a program executed by the MCU 402, etc. The RAM 405 is a storage unit that stores therein transient processing data of the MCU 402. The non-volatile memory 406 is writable memory and is a storage unit that retains predetermined written data even when the power supply ceases. For example, the writable non-volatile memory 406 may be flash memory. The storage units such as the ROM 404, the RAM 405, and the non-volatile memory 406 store information such as a nearby node list, a suspended node list, received signals described later, for example.

The harvester 412 generates electricity based on a change in energy of external environment, for example, light, vibration, temperature, and radio waves at the installation site of the sensor node 101. Although only the one harvester 412 is disposed in the example depicted FIG. 4, multiple harvesters 412 of the same type may be disposed or multiple harvesters 412 of different types may be disposed. The harvester 412 may generate electricity according to a change detected by the sensor 401 or may generate electricity according to a change in reception radio waves received by the short-distance radio circuit 408. The battery 411 stores the electric power generated by the harvester 412. Therefore, the sensor node 101 is not disposed with a primary battery or an external power source and internally generates electric power required for operation of the sensor node 101. The power source management unit 410 controls the supply of the electric power stored in the battery 411 as a driving power source to the units of the sensor node 101.

Figure 5:
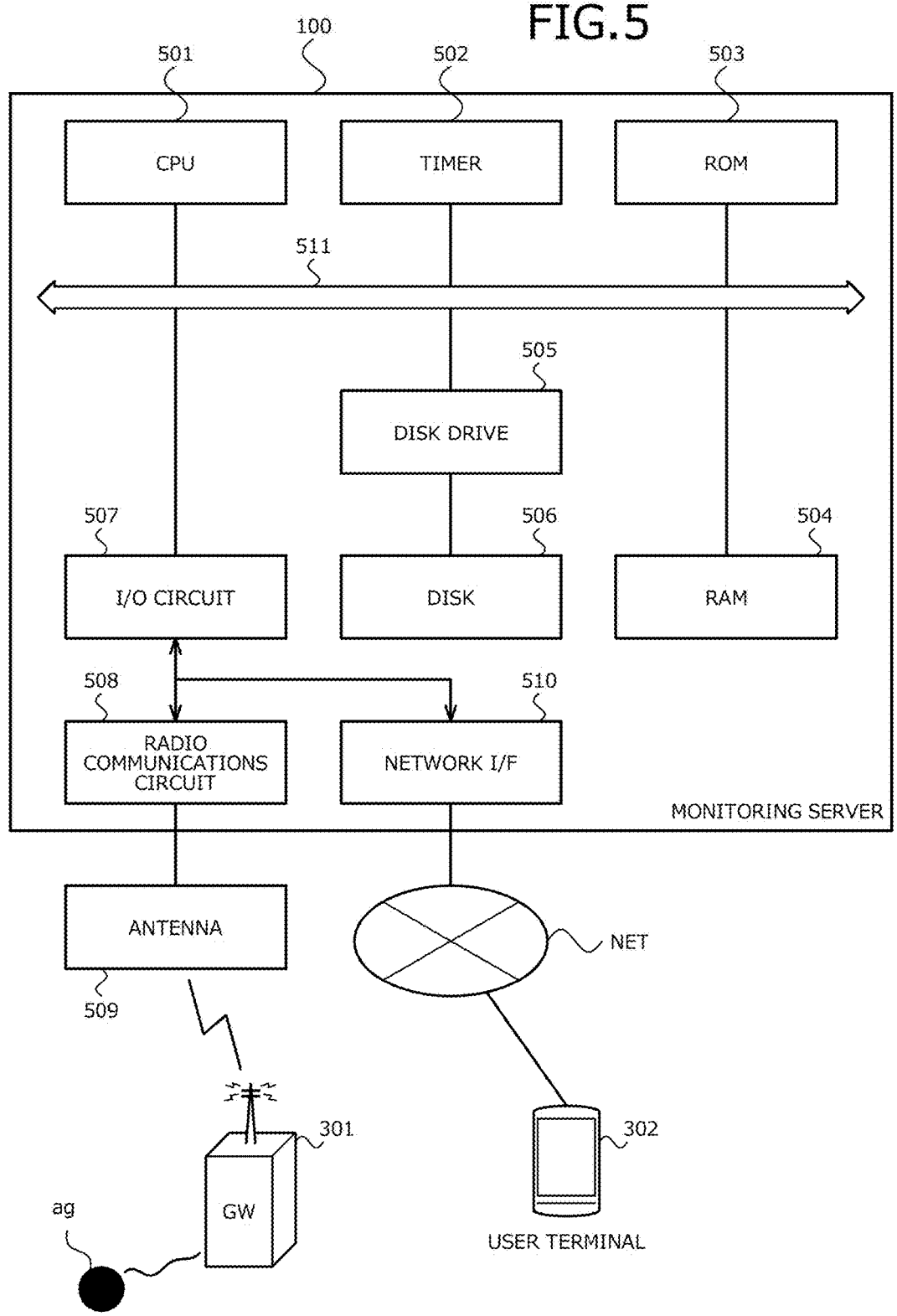
FIG. 5 is a block diagram of a hardware configuration example of a monitoring server 100.

FIG. 5 is a block diagram of a hardware configuration example of the monitoring server 100. Unlike the sensor node 101, the monitoring server 100 operates based on an external power source. The monitoring server 100 has a central processing unit (CPU) 501, a timer 502, ROM 503, RAM 504, a disk drive 505, a disk 506, and an input/output (I/O) circuit 507. The monitoring server 100 has an internal bus 511 connecting the CPU 501, the timer 502, the ROM 503, the RAM 504, the disk drive 505, and the I/O circuit 507.

The CPU 501 is a control unit that provides overall control of the monitoring server 100. The ROM 503 is a storage unit that stores therein a program such as a boot program. The RAM 504 is a storage unit that is used as a work area of the CPU 501. The disk drive 505, under the control of the CPU 501, controls the reading and writing of data with respect to the disk 506. The disk 506 is a storage unit that stores therein data written thereto under the control of the disk drive 505. The disk 506 may be a magnetic disk, an optical disk, etc.

The I/O circuit 507 is connected to a radio communications circuit 508 and an antenna 509. As a result, the monitoring server 100 can wirelessly communicate with the gateway 301 via the radio communications circuit 508 and the antenna 509 to wirelessly communicate with the sensor nodes 101. The I/O circuit 507 is also connected to a network I/F 510. This enables the monitoring server 100 to communicate with an external device such as a user terminal 302 over a network NET such as the Internet through a TCP (Transmission Control Protocol)/IP (Internet Protocol) protocol process via the network I/F 510. Communication through the network I/F 510 may be wireless communication or wired communication.

Although not depicted, the monitoring server 100 may be provided with an input device such as a keyboard, a mouse, and a touch panel. As a result, the developer can directly operate the monitoring server 100 through the input device. For example, the monitoring server 100 may be provided with an output device such as a display, a printer, and a buzzer. The gateway 301 may have the same configuration.

Figure 6:
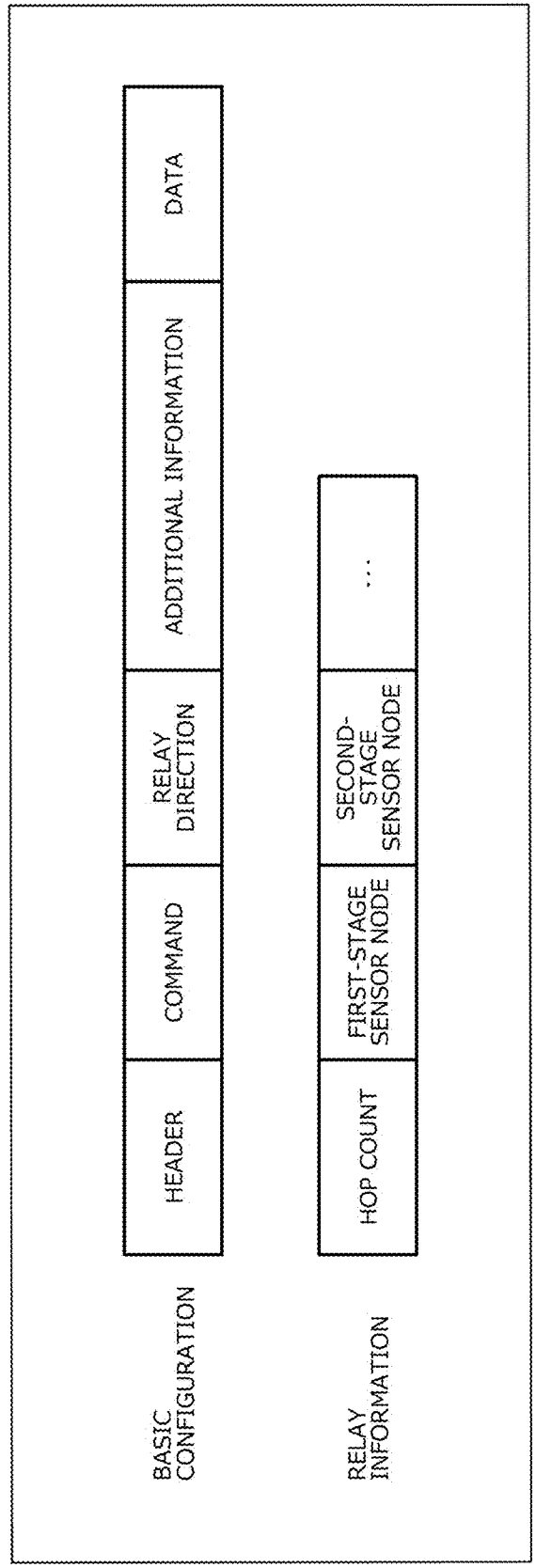
FIG. 6 is an explanatory diagram of a basic data configuration example of signals.

FIG. 6 is an explanatory diagram of a basic data configuration example of signals. The basic configuration of signals has a header, a command, a relay direction, additional information, and data. The header is added based on the communication protocol. Since the communication between the sensor nodes 101 is short-distance wireless communication and the communication between the monitoring server 100 and the aggregator ag is long-distance wireless or wired communication, the communication protocols are different. Therefore, in this embodiment, signal headers are switched by an aggregator that relays communication between the multiple sensor nodes 101 and the monitoring server 100.

The command is information that indicates the category of a signal. The relay direction is information indicating the type of destination. The relay direction includes four types, a P2P, a node, an aggregator ag, and a broadcast. The additional information differs according to the type of the relay direction.

When the relay direction is a P2P, this means that a signal is transmitted/received between a parent node and a child node and the additional information has identification information indicating the source and identification information indicating the destination. A parent-child relation is established with a nearby connection node cnd. When a signal from the aggregator ag is transferred, the source is a parent node and the destination is a child node. When a signal to the aggregator ag is transferred, the source is a child node and the destination is a parent node. Which sensor node 101 is a parent node, which sensor node 101 is a child node, etc. are stored in the non-volatile memory 406. If the relay direction is a node, this means that a signal is transmitted from the aggregator ag through a relay transfer to the specified sensor node 101 and the additional information has relay information. If the relay direction is the aggregator ag, this means that a signal is transmitted from one of the sensor nodes 101 to the aggregator ag. In this case, since the signal can be sent to the aggregator ag when the sensor nodes 101 transfer the signal by setting the parent node as the destination during the relay transfer, the additional information has only the identification information indicating the destination. When the relay direction is a broadcast, a signal is transmitted to all the nearby sensor nodes 101 and therefore, the additional information has only the identification information indicating the source.

The relay information has a hop count and addresses of the sensor nodes 101 through which the signal has passed, such as an address of the first-stage sensor node 101 and an address of the second-stage sensor node 101.

Figure 7:
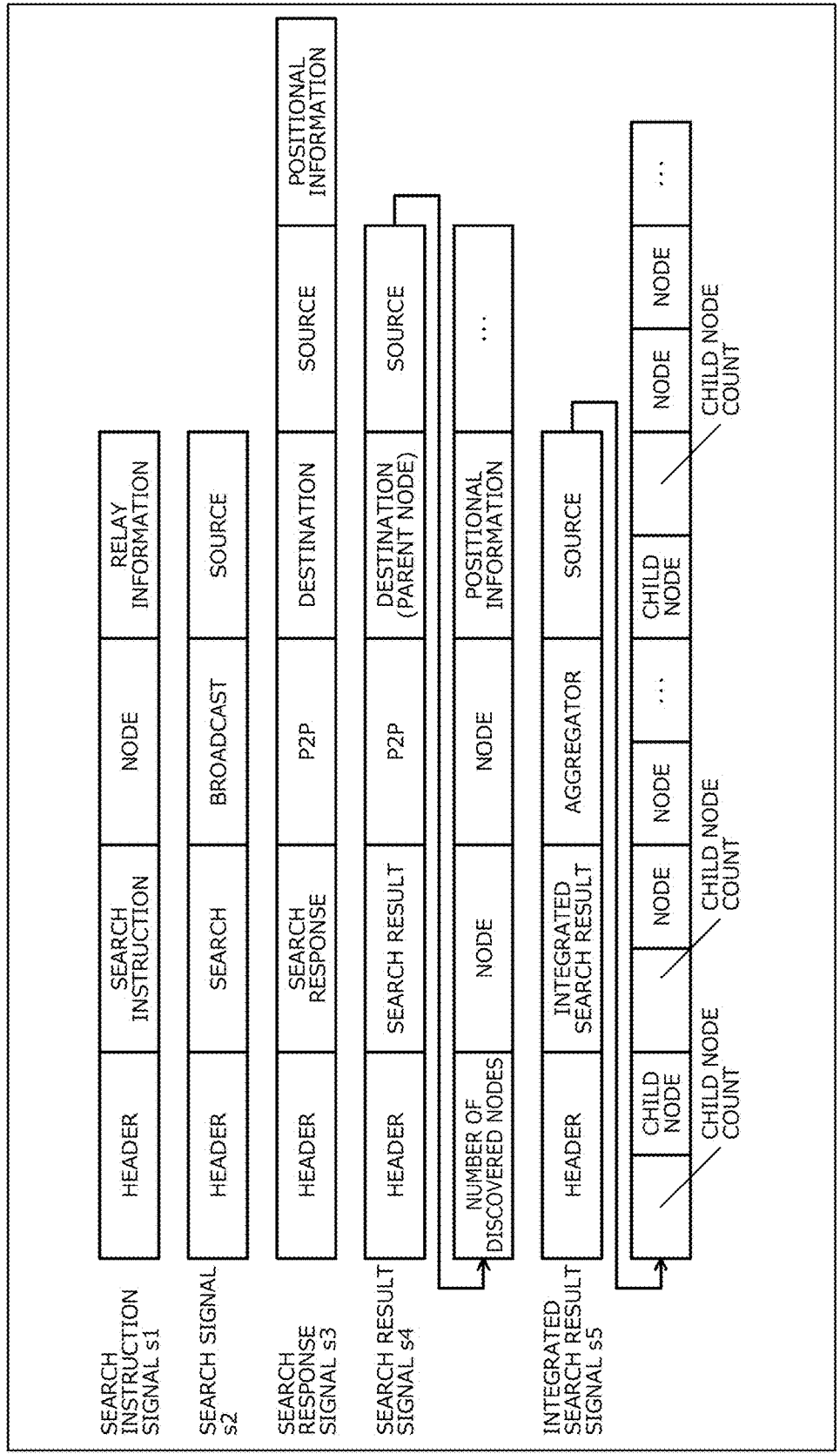
FIGS. 7 and 8 are explanatory diagrams of data configuration examples of signals.
Figure 8:
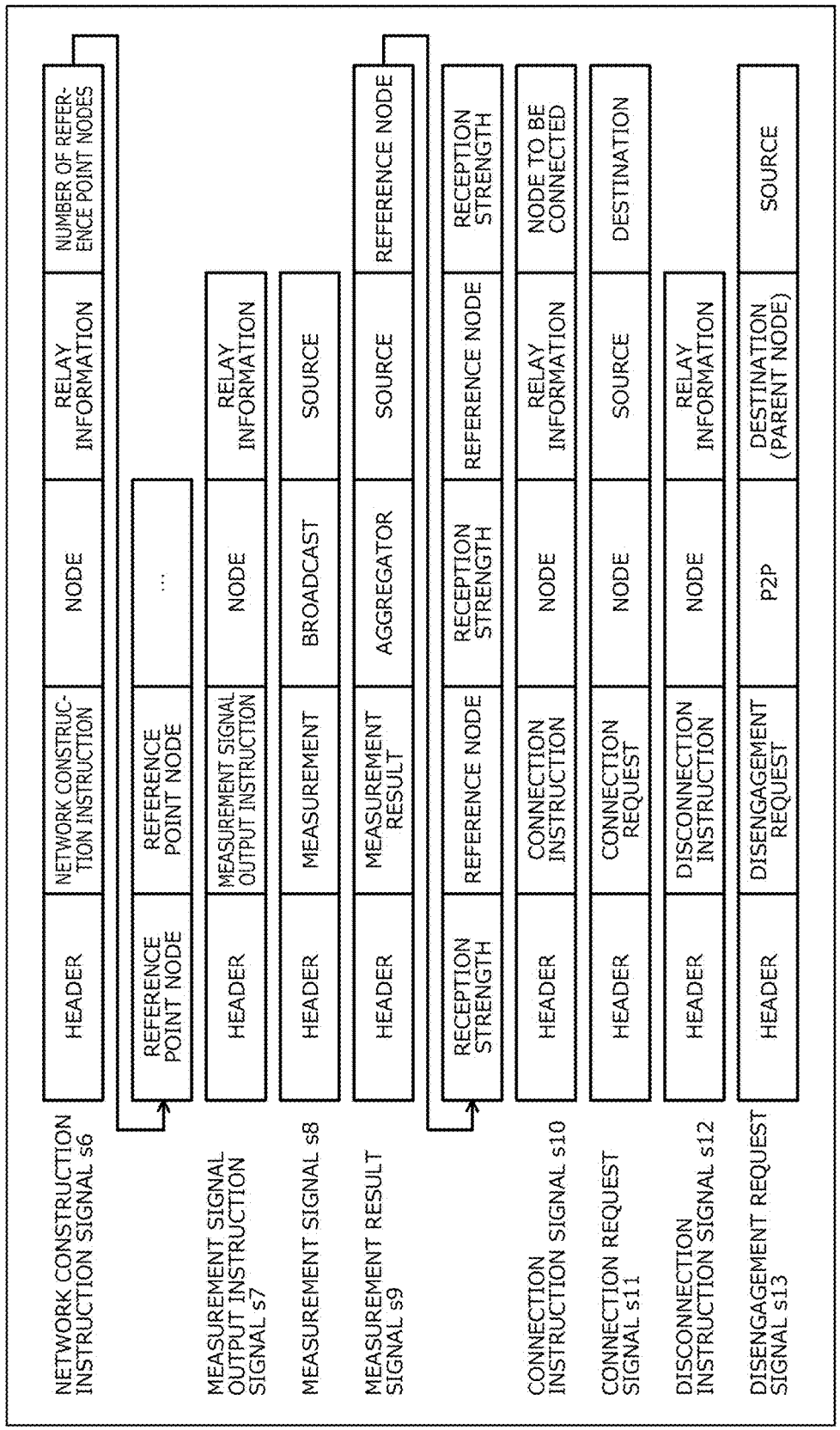

FIGS. 7 and 8 are explanatory diagrams of data configuration examples of signals. The signals transmitted or received by the sensor nodes 101 or the monitoring server 100 include a search instruction signal s1, a search signal s2, a search response signal s3, a search result signal s4, an integrated search result signal s5, a network construction instruction signal s6, and a measurement signal output instruction signal s7. The signals transmitted and received by the sensor nodes 101 and the monitoring server 100 include a measurement signal s8, a measurement result signal s9, a connection instruction signal s10, a connection request signal s11, a disconnection instruction signal s12, and a disengagement request signal s13.

The search instruction signal s1 is a signal for the monitoring server 100 to instruct a sensor node 101 to search for sensor nodes 101 capable of responding to a signal transmitted by the sensor node 101 at a predetermined strength. The search instruction signal s1 has the header, information indicating a search instruction as the command, information indicating a node as the relay direction, and relay information as the additional information.

The search signal s2 is a signal for the sensor node 101 instructed by the monitoring server 100 to search for the sensor nodes 101 capable of returning a response. The search signal s2 has the header, information indicating a search as the command, information indicating a broadcast as the relay direction, and identification information as the additional information.

The search response signal s3 is a signal indicating a response to the search signal s2. The search response signal s3 has the header, information indicating a search response as the command, information indicating P2P as the relay direction, identification information indicating the destination and identification information indicating the source, as the additional information, and positional information as the data. The destination is the source of the search signal s2. The sensor nodes 101 capable of measuring position with the sensor thereof like GPS includes in the search response signal s3, positional information indicating position. The sensor nodes 101 capable of measuring position with the sensor thereof are also referred to as reference point nodes.

The search result signal s4 is a signal having a search result based on the received search response signal s3. For example, the search result is a list of the identification information of the found sensor nodes 101. The search result signal s4 has the header, information indicating a search result as the command, information indicating P2P as the relay direction, and identification information indicating the destination and identification information indicating the parent node source, as the additional information. The search result signal s4 also has the number of discovered nodes, identification information of the nodes, positional information, etc. as the data.

The integrated search result signal s5 is a signal that has a result integrated based on the search result signal s4 received by the parent node. For example, in the integrated search result signal s5, search results included in the search result signal s4 are sorted according to child node. As a result, it can be determined from the integrated search result signal s5 which child node was able to find which node. Additionally, it can be determined which sensor node is connected as the child node in the construction of the network SNET. The integrated search result signal s5 has the header, information indicating an integrated search result as the command, information indicating the aggregator ag as the relay direction, and identification information indicating the destination, as the additional information. The integrated search result signal s5 also has the number of child nodes as well as identification information indicating the child nodes, the number of discovered nodes, the node addresses found by the child node, etc. for each of the child nodes as the data.

The network construction instruction signal s6 is a signal for the monitoring server 100 to instruct the sensor nodes 101 to construct the network SNET. The network construction instruction signal s6 has the header, information indicating a network SNET construction instruction as the command, information indicating a node as the relay direction, and relay information, the number of reference point nodes, and identification information indicating the reference point nodes, as the additional information.

The measurement signal output instruction signal s7 is a signal for the monitoring server 100 to instruct the sensor nodes 101 to output the measurement signal s8 for measuring a position. The measurement signal output instruction signal s7 has the header, information indicating the measurement signal output instruction signal s7 as the command, information indicating a node as the relay direction, and relay information as the additional information.

The measurement signal s8 is a signal for measuring position and is a signal transmitted at a predetermined strength. The measurement signal s8 has the header, information indicating the measurement signal s8 as the command, information indicating a broadcast as the relay direction, and identification information indicating the source, as the additional information.

The measurement result signal s9 is a signal having a position measurement result corresponding to the measurement signal s8. The measurement result signal s9 has the header, information indicating the measurement result as the command, information indicating the aggregator ag as the relay direction, and identification information indicating the source, as the additional information. The measurement result signal s9 also has three combinations of the identification information indicating the reference point node that is the source of the received measurement signal s8 and the reception strength, as the data.

The connection instruction signal s10 is a signal instructing the recipient sensor node 101 to connect as a child node. The connection instruction signal s10 has the header, information indicating a connection instruction as the command, information indicating a node as the relay direction, relay information of the sensor node 101 to be connected and identification information indicating the node to be connected, as the additional information.

The connection request signal s11 is a signal that requests the sensor node 101 indicated by the connection instruction signal s10 to connect to the source sensor node 101 as the parent node. The connection request signal s11 has the header, information indicating a connection request as the command, information indicating a node as the relay direction, and identification information indicating the source and the destination, as the additional information.

The disconnection instruction signal s12 is a signal for the monitoring server 100 to instruct a sensor node 101 to disconnect from the network SNET. The disconnection instruction signal s12 has the header, information indicating a disconnection instruction as the command, information indicating a node as the relay direction, and the relay information as the additional information.

The disengagement request signal s13 is a signal for a sensor node 101 to make a request for disengagement from the parent-child relation to the parent node. The disengagement request signal s13 has the header, information indicating a disengagement request as the command, P2P as the relay direction, and identification information indicating the destination and identification information indicating the source, as the additional information. The identification information indicating the parent node is set as the identification information indicating a destination.

Figure 9:
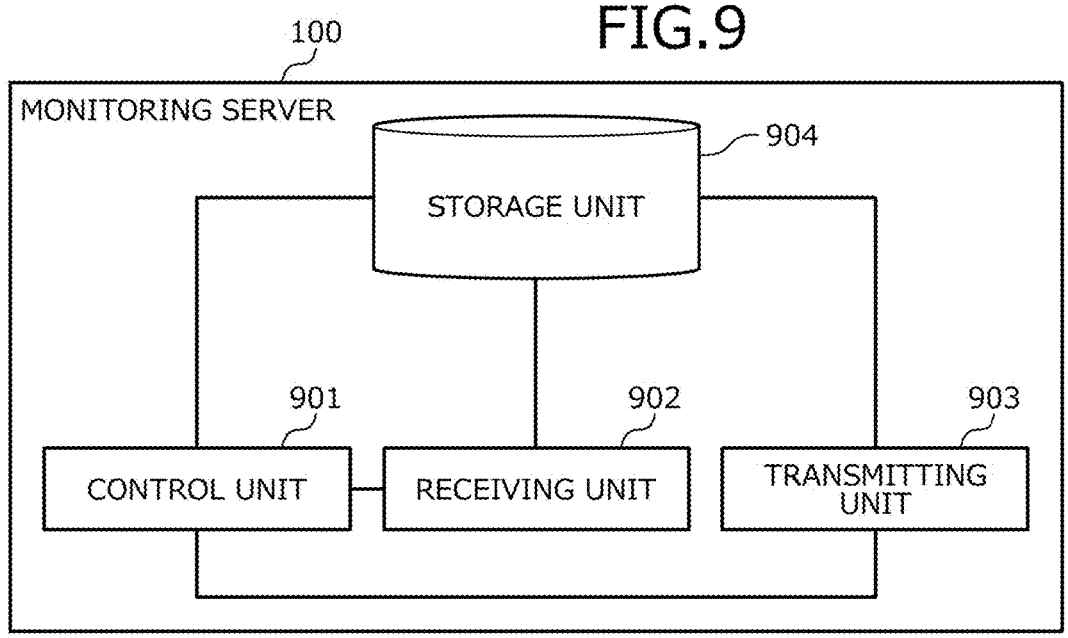
FIG. 9 is a block diagram of a functional configuration example of the monitoring server 100.

FIG. 9 is a block diagram of a functional configuration example of the monitoring server 100. The monitoring server 100 has a control unit 901, a receiving unit 902, a transmitting unit 903, and a storage unit 904. The receiving unit 902 and the transmitting unit 903 are implemented by a radio communications circuit. The storage unit 904 is implemented by a storage device such as the RAM 504 and the disk 506, for example. The control unit 901 is implemented by the CPU 501 by reading a program stored in the storage unit 904 and executing a process coded in the program. Various process results of the control unit 901 are stored to the storage unit 904.

Figure 10:
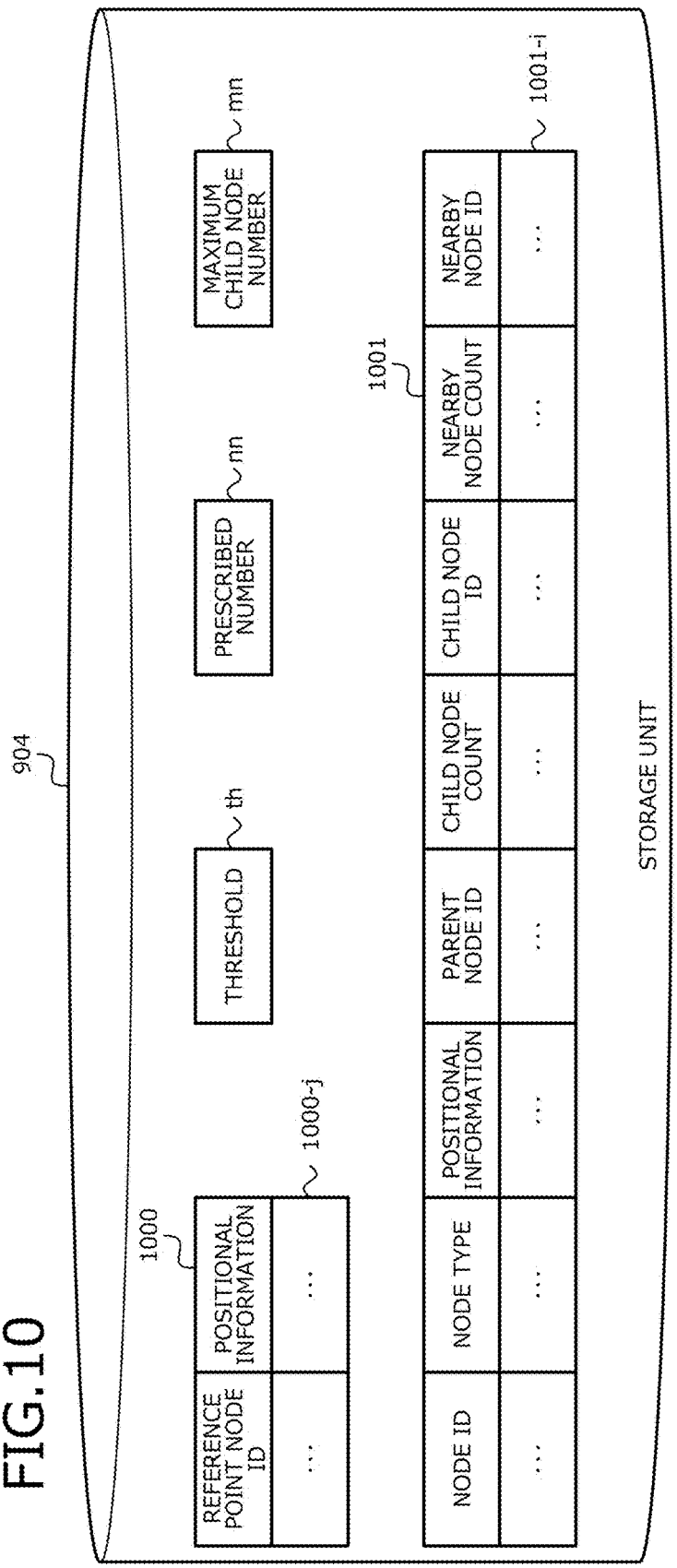
FIG. 10 is an explanatory diagram of an example of storage contents of a storage unit 904 of the monitoring server 100.

FIG. 10 is an explanatory diagram of an example of storage contents of the storage unit 904 of the monitoring server 100. The storage unit 904 has, for example, a node management information 1001, reference point node information 1000, a threshold value th, and a prescribed number nn. The threshold value th is a value for determining whether the density is low, and is a value defined by the developer of the system 300. The prescribed number nn is the maximum number of sensor nodes included in the network SNET and is a value defined by the developer of the system 300. For example, the prescribed number is ½ of the total number of the sensor nodes 101 etc. A maximum child node number mn is the number of sensor nodes that can be connected as child nodes to each of the sensor nodes 101, and is a value defined by the developer of the system 300. For example the maximum child node number mn may be defined based on power consumption at which each of the sensor nodes 101 can transfer signals. The power consumption available for the transfer is defined from the amount of electric power stored in the battery 411 or a power consumption required for reception and transmission of a signal.

The node management information 1001 is information indicating a parent node, a child node, and a nearby node for each of the sensor nodes 101. For example, the node management information 1001 has fields of a node ID, a node type, positional information, a parent node ID, the child node number, a child node ID, the nearby node number, and a nearby node ID. Information is set in the fields and thereby stored as a record (1001-$i$). In the field of the node ID, the identification information enabling unique identification of a sensor node 101 is set. In the field of the node type, the type of the sensor node 101 is set. This node type may be the aggregator ag, a reference point node, a normal node, and a redundant node rnd. A normal node is a node at a position not known in advance and is a node not subject to position measurement or a node at a position not ascertained by the position measurement. A redundant node rnd is a node disconnected according to a disconnection instruction. Although a node never added to the network SNET is also a redundant node rnd, the monitoring server 100 cannot discriminate the identification information indicating that sensor node 101 and therefore, cannot set the information in the node management information 1001. Thus, a sensor node 101 having the node type set to a redundant node rnd is a node disconnected from the network SNET according to a disconnection instruction after having been added to the network SNET.

In the field of the positional information, the positional information indicating the position of the sensor node 101 is set. In the field of the parent node ID, identification information enabling unique identification of a connected parent node is set. In the field of the child node number, the number of connected child nodes is set. In the field of the child node ID, identification information enabling unique identification of a child node is set. In the field of the nearby node number, the number of found nearby nodes is set. In the field of the nearby node ID, identification information enabling unique identification of a found nearby sensor node 101 is set.

The reference point node information 1000 is information for storing positional information for each reference point node. The reference point node information 1000 has fields of a reference point node ID and positional information. Information is set in the fields and thereby stored as a record (1000-$j$). In the field of the reference point node ID, identification information indicating the reference point node is set. In the field of the positional information, information indicating the position of the reference point node is set. The information indicating the position is not particularly limited and may be, for example, latitude and longitude, or a distance between the monitoring server 100 and the reference point node if the position of the monitoring server 100 is clearly known.

Here, the reference of description returns to FIG. 9. The receiving unit 902 has a function of receiving various signals from the aggregator ag. The transmitting unit 903 has a function of transmitting various signals to the aggregator ag. The control unit 901 executes a provisional network construction process, a position measurement process, a node distribution density analysis process, and a density difference elimination process. The control unit 901 has a function of generating signals to be transmitted by the transmitting unit 903 and a function of analyzing signals received by the receiving unit 902.

Figure 11:
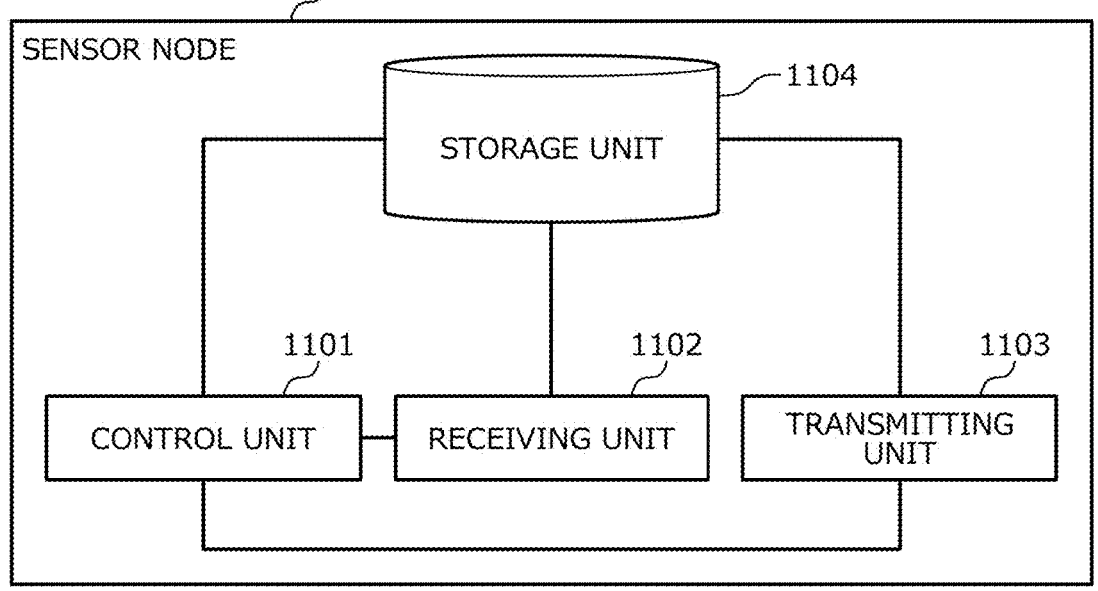
FIG. 11 is a block diagram of a functional configuration example of a sensor node 101.

FIG. 11 is a block diagram of a functional configuration example of the sensor node 101. The sensor node 101 has a control unit 1101, a receiving unit 1102, a transmitting unit 1103, and a storage unit 1104. The receiving unit 1102 is implemented by the reception circuit 422. The transmitting unit 1103 is implemented by the transmission circuit 421. The storage unit 1104 is implemented by a storage device such as the RAM 405 and the non-volatile memory 406, for example. The control unit 1101 is implemented by the MCU 402 reading a program stored in the storage unit 1104 and executing a process coded in the program. Various process results of the control unit 1101 are stored to the storage unit 1104.

Figure 12:
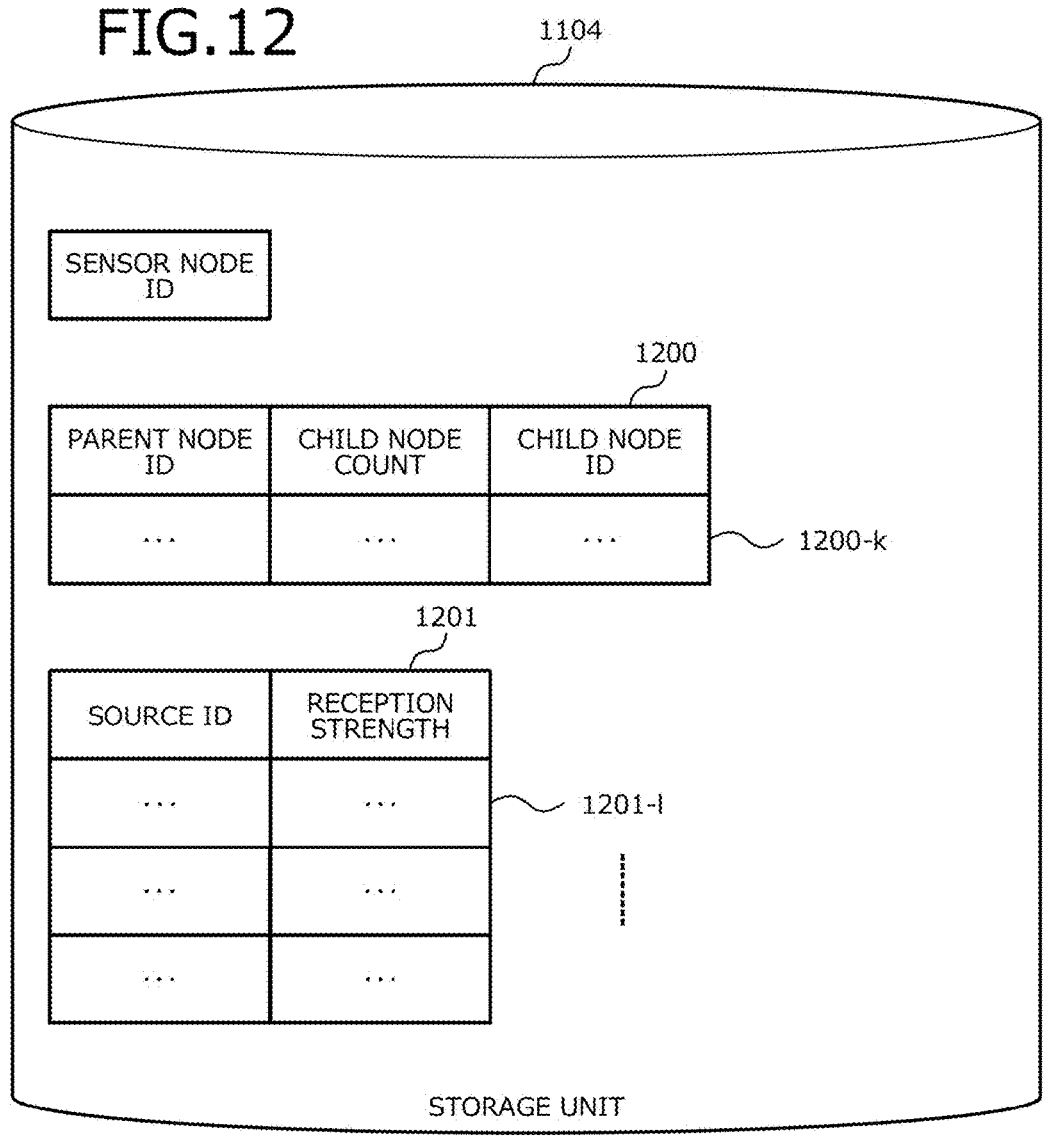
FIG. 12 is an explanatory diagram of an example of storage contents of a storage unit of the sensor node 101.

FIG. 12 is an explanatory diagram of an example of storage contents of the storage unit of the sensor node 101. The storage unit 1104 has, for example, an ID of the sensor node 101 thereof, connection information 1200, and position measurement information 1201.

The ID of the sensor node 101 thereof is identification information enabling unique identification of the sensor node 101. The sensor nodes may be numbered at the start of operation of the sensor nodes or serial numbers of the sensor nodes at the time of shipment, etc. may be used as the IDs specific to the sensor nodes 101, respectively. The connection information 1200 is information enabling discrimination between a parent node and a child node when the sensor node is included in the network SNET. For example, the connection information 1200 has fields of a parent node ID, the child node number, and a child node ID. In the field of the parent node ID, identification information enabling unique identification of a parent node is set. If the sensor node 101 is the aggregator ag, no information is set in the field of the parent node ID since no parent node exists. In the field of the child node number, the number of child nodes is set. In the field of the child node ID, the identification information enabling unique identification of a child node is set. Information is set in the fields and thereby stored as a record (1200-k).

The position measurement information 1201 has fields of a source ID and a reception strength. In the field of the source ID, identification information is set that enables unique identification of the source of the measurement signal s8 described later. In the field of the reception strength, the reception strength of the measurement signal s8 described later is set. This reception strength indicates the strength of a received signal. The reception strength is, for example, Received Signal Strength Indicator (RSSI) and a reception power [dBm]. In this regard, when it is assumed that the arrangement area (area) is a planar surface and that the monitoring server 100 determines the positions of the sensor nodes 101 by using trilateration, three pairs of the source ID and the reception strength may be set as the position measurement information 1201.

Here, the reference of description returns to FIG. 11. The receiving unit 1102 has a function of receiving signals from the other sensor nodes 101 or the monitoring server 100. The receiving unit 1102 can measure the reception strength of the received signals. The transmitting unit 1103 has a function of transmitting signals to the other sensor nodes 101 or the monitoring server 100. The transmitting unit 1103 transmits signals at a predetermined strength. In particular, concerning the transmission of the measurement signal s8 and the search signal s2 described above, by setting the same strengths for each in all the sensor nodes 101, the identification and search of the positions of the sensor nodes 101 by the monitoring server 100 can be facilitated. The control unit 1101 executes a search process, a position measurement process, a process of connection to the network SNET, a process of disconnection from the network SNET, etc. The control unit 1101 has a function of generating signals to be transmitted by the transmitting unit 1103 and a function of analyzing signals received by the receiving unit 1102. In the present embodiment, only the aggregator ag directly transmits and receives signals with respect to the monitoring server 100.

The provisional network construction process by the monitoring server 100 will be described with reference to FIG. 13.

Figure 13:
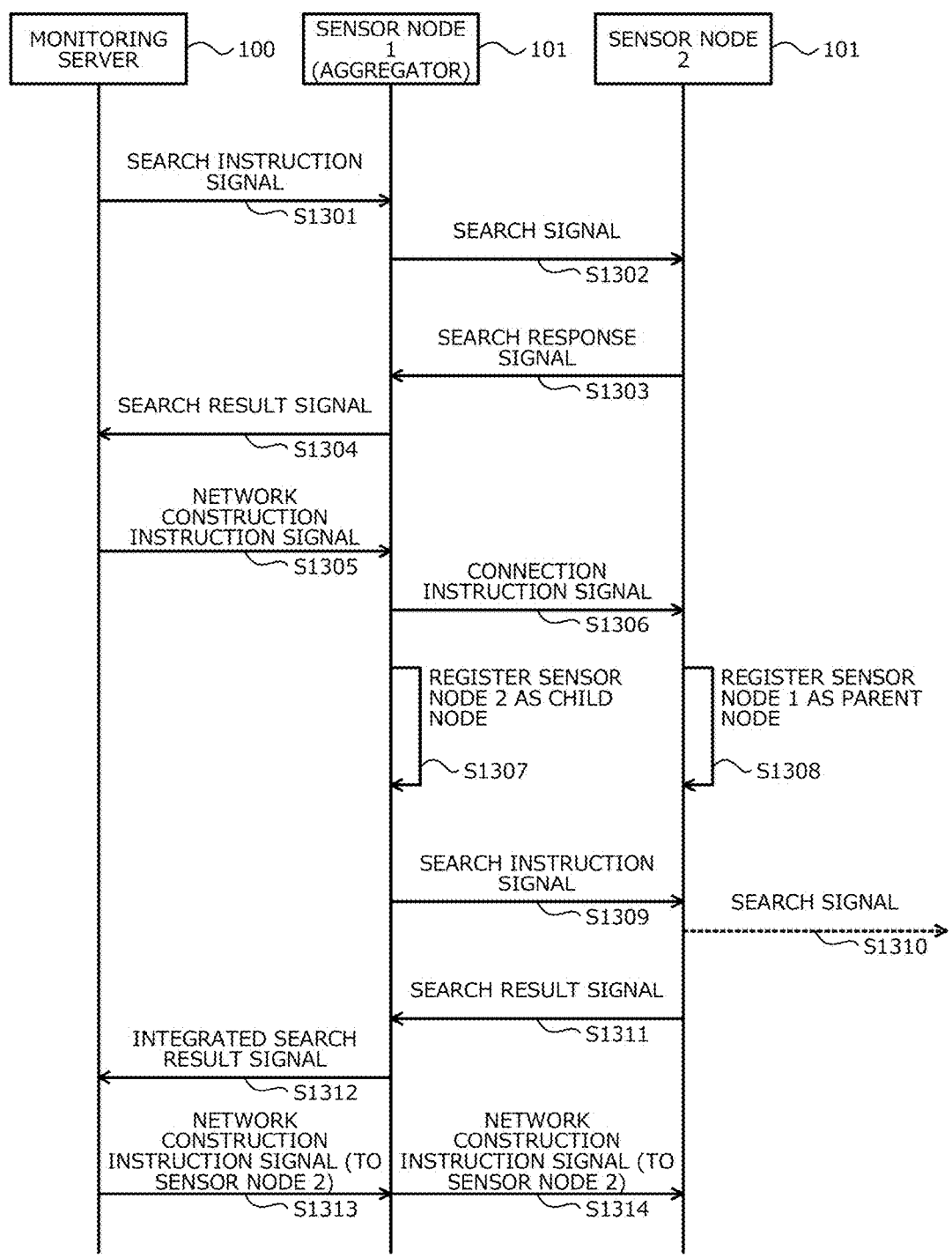
FIG. 13 is an explanatory diagram of an operation sequence example of provisional network SNET construction.

FIG. 13 is an explanatory diagram of an operation sequence example of provisional network SNET construction. The gateway 301 is omitted in this description. First, the monitoring server 100 transmits the search instruction signal s1 to the sensor node 101-1 acting as the aggregator ag (step S1301). When receiving the search instruction signal s1, the sensor node 101-1 transmits the search signal s2 by broadcast (step S1302). When receiving the search signal s2 from the sensor node 101-1, the sensor node 101-2 transmits the search response signal s3 to the sensor node 101-1 (step S1303). When receiving the search response signal s3 from the sensor node 101-2, the sensor node 101-1 transmits to the monitoring server 100 the search result signal s4 created from the search response signal s3 unless the sensor node 101-1 is a child node of another one of the sensor nodes 101 (step S1304). In the example depicted in FIG. 11, the sensor node 101-2 is the only sensor node 101 receiving the search signal s2 transmitted from the sensor node 101-1 for facilitating the understanding. However, the search response signals s3 may be received from the multiple sensor nodes 101. For example, the sensor node 101-1 may create the search result signal s4 from the search response signals s3 received within a predetermined time after transmission of the search signal s2. The predetermined time is a value defined by the developer of the system 300.

When receiving the search result signal s4, the monitoring server 100 transmits the network construction instruction signal s6 to the sensor node 101-1 acting as the aggregator ag (step S1305). When receiving a network SNET construction instruction, the sensor node 101-1 transmits the connection instruction signal s10 to all the found nearby nodes if the number of the found nearby nodes is smaller than the maximum child node number mn. If the number of the found nearby nodes is equal to or greater than the maximum child node number mn, the sensor node 101-1 selects reference point nodes from the nearby nodes. If the number of the selected reference point nodes is smaller than the maximum child node number mn, the sensor node 101-1 transmits the connection instruction signal s10 to all the selected reference point nodes. If the number of the selected reference point nodes is equal to or greater than the maximum child node number mn, the sensor node 101-1 randomly selects nodes to the maximum child node number mn from the selected reference point nodes and transmits the connection instruction signal s10 to the selected reference point nodes of the maximum child node number mn. In this example, the sensor node 101-1 transmits the connection instruction signal s10 to the sensor node 101-2 (step S1306). The sensor node 101-1 registers the sensor node 101-2 that is the destination of the connection instruction signal s10 as a child node (step S1307). When receiving the connection instruction signal s10 from the sensor node 101-1, the sensor node 101-2 registers the sensor node 101-1 as a parent node (step S1308).

The sensor node 101-1 transmits the search instruction signal s1 to the child node (step S1309). When receiving the search instruction signal s1, the sensor node 101-2 acting as the child node of the sensor node 101-1 transmits the search signal s2 (step S1310). Although not depicted, when receiving the search response signal s3 from the nearby sensor node 101, the sensor node 101-2 transmits the search result signal s4 to the sensor node 101-1 (step S1311). For example, although the sensor node 101-1 is a sensor node near the sensor node 101-2 and therefore can receive the search signal s2, the sensor node 101-1 is already added to the provisional network SNET. Therefore, the sensor node 101-1 does not transmit the search response signal s3 to the sensor node 101-2. The sensor node 101-1 receives the search response signals s3 from the child nodes and transmits to the monitoring server 100, the integrated search result signal s5 created from the search response signals s3 (step S1312).

When receiving the integrated search result signal s5, the monitoring server 100 updates the total node number based on the integrated search result signal s5. If the total node number reaches a prescribed number, the monitoring server 100 terminates the provisional network SNET construction and if the total node number is less than the prescribed number, the monitoring server 100 records the search result and selects a parent node candidate. In this case, the sensor node 101 having a smaller number of overlaps is selected as the parent node candidate.

Figure 14:
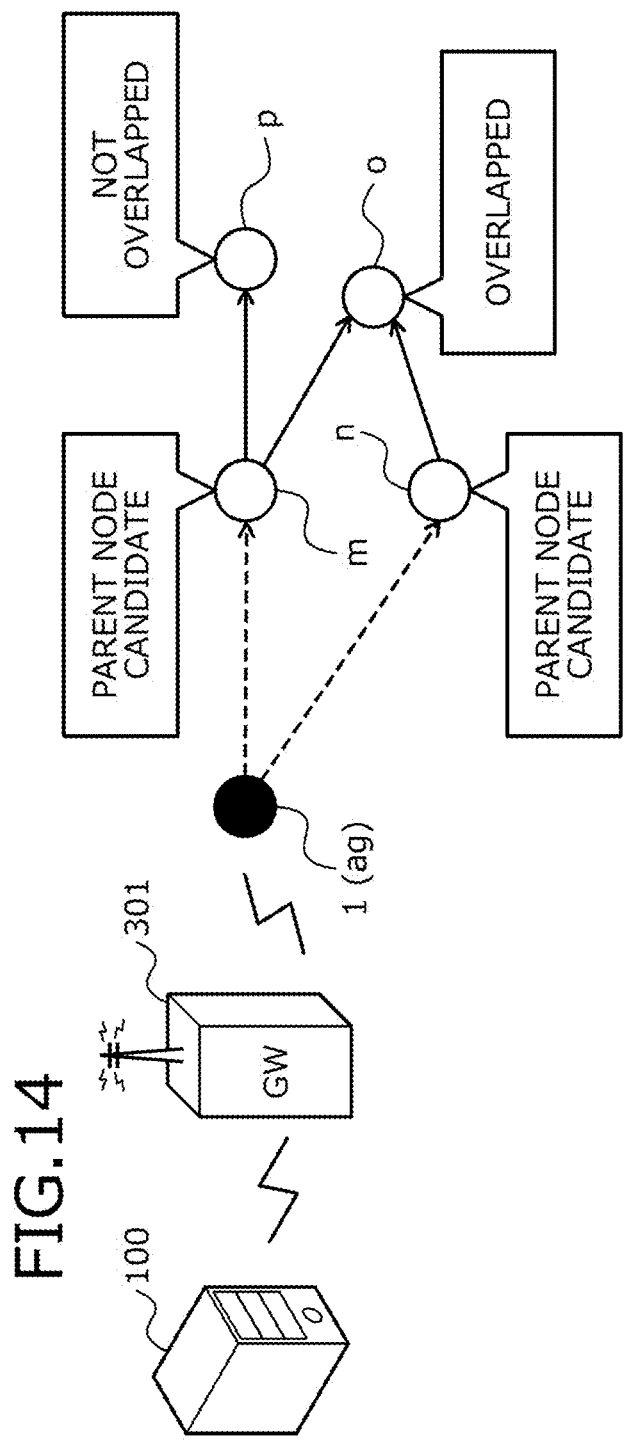
FIG. 14 is an explanatory diagram of an example of a node having a smaller number of overlaps.

FIG. 14 is an explanatory diagram of an example of a node having a smaller number of overlaps. For example, a sensor node 101-*o* receives the search signal s2 from each of sensor nodes 101-*n* and 101-*m* that are the parent node candidates, and transmits the search response signals s3 in response to the respective search signals s2. Therefore, the monitoring server 100 determines that the sensor node 101-*o* is overlapped between the two sensor nodes 101. For example, a sensor node 101-*p* receives the search signal s2 only from the sensor node 101-*m* and transmits the search response signal s3 in response to the search signal s2. Therefore, the monitoring server 100 determines that the sensor node 101-*p* is not overlapped.

Here, the reference of description returns to FIG. 13. The monitoring server 100 transmits the network construction instruction signal s6 addressed to the selected parent node candidate. In this example, the monitoring server 100 transmits the network construction instruction signal s6 addressed to the sensor node 101-2 (step S1313). The sensor node 101-1 transfers to the sensor node 101-2, the network construction instruction signal s6 received from the monitoring server 100 (step S1314). The relay transfer through the multihop communication is performed in this way and the network construction instruction signal s6 is transferred.

The monitoring server 100 repeats the process as described at steps S1306 to S1314. If the total node number reaches a predetermined node number or more, the monitoring server 100 terminates the provisional network SNET construction. The position measurement process will be described with reference to FIG. 15.

Figure 15:
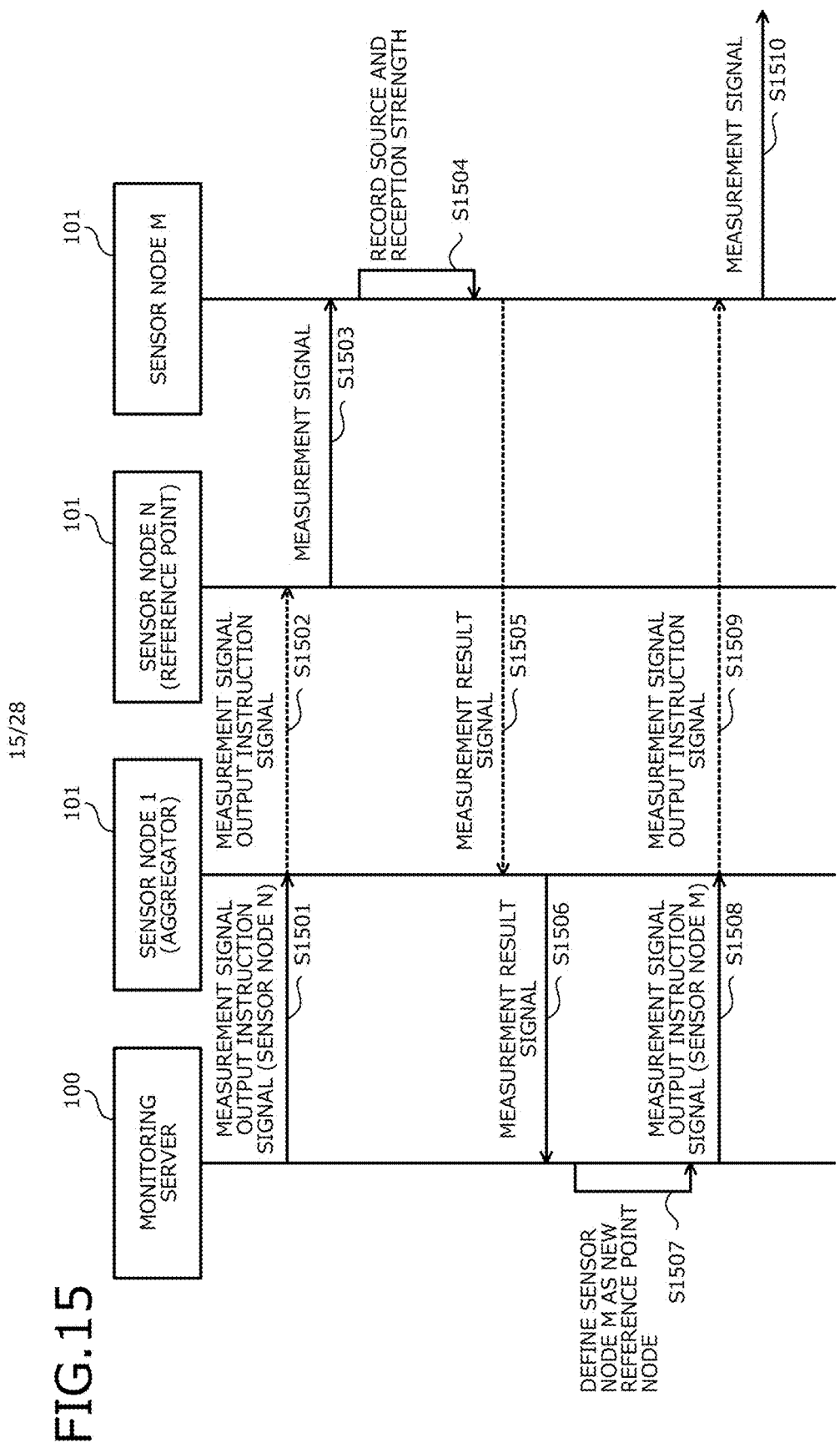
FIG. 15 is an explanatory diagram of an operation sequence example of position measurement.

FIG. 15 is an explanatory diagram of an operation sequence example of position measurement. In this description, a sensor node 101-N is a reference point node and a sensor node 101-M is present near the sensor node 101-N. The gateway 301 is omitted in this description.

First, the monitoring server 100 transmits the measurement signal output instruction signal s7 with the destination set to a reference point node (step S1501). The reference point node can be distinguished according to the reference point node information 1000. The sensor node 101-1 acting as the aggregator ag receives the measurement signal output instruction signal s7 and transfers the measurement signal output instruction signal s7 (step S1502). For example, when receiving the measurement signal output instruction signal s7, a sensor node 101 determines whether the signal is addressed to the sensor node 101 according to the identification information indicating the destination. If it is determined that the signal is not addressed to the sensor node 101, the sensor node 101 transfers the measurement signal output instruction signal s7. The measurement signal output instruction signal s7 arrives through such relay transfer at the sensor node 101-N.

When receiving the measurement signal output instruction signal s7, the sensor node 101-N determines that the signal is addressed to the sensor node 101-N, and transmits the measurement signal s8 at a predetermined strength (step S1503). The predetermined strength is defined in advance. The sensor nodes 101 within a reachable distance of the signal transmitted at the predetermined strength from the sensor node 101-N receive the measurement signal s8. For example, in the example of FIG. 15, the sensor node 101-M receives the measurement signal s8 from the sensor node 101-N.

The sensor node 101-M records the identification information indicating the source included in the received measurement signal s8 and the reception strength of the measurement signal s8 into the position measurement information 1201 in a storage unit 1104-M (step S1504). If the area provided with the sensor nodes 101 is a planer surface, the reception intensities from three reference point nodes may be required for measurement of a position of each of the sensor nodes 101. The sensor node 101 receiving the measurement signal s8 may calculate the distance between the sensor node 101 and the source of the measurement signal s8 according to the reception strength. For example, when receiving the measurement signals s8 from three different reference point nodes, the sensor node 101-M stores the reception strength for each destination of the three measurement signals s8. The sensor node 101-M transmits the measurement result signal s9, which includes the identification information indicating the sensor node 101-M and the reception strength of the measurement signal s8 correlated with identification indicating a destination for each destination of the three measurement signals s8 (step S1505). Although the measurement result signal s9 is depicted as being directly transmitted from the sensor node 101-M to the sensor node 101-1 acting as the aggregator ag in the example depicted in FIG. 15, the measurement result signal s9 may be sent to the sensor node 101-1 through relay transfer. When receiving the measurement result signal s9, the sensor node 101-1 transfers the measurement result signal s9 to the monitoring server 100 (step S1506).

When receiving the measurement result signal s9 from the sensor node 101-1, the monitoring server 100 acquires positional information corresponding to the identification information indicating the three sources based on the reference point node information 1000. The monitoring server 100 identifies the distance between the sensor node 101-M and each source based on the reception strength correlated with the identification information indicating the sources included in the measurement result signal s9. The reception strength can be obtained from the antenna 409, for example. If the transmission strengths of the measurement signals s8 transmitted by the sensor nodes 101 are constant, a sensor node 101 associated with a larger loss in reception strength is further from the source of the measurement signals s8, while a sensor node 101 associated with a smaller loss in reception strength is closer to the source of the measurement signals s8. The transmission strength of the measurement signals s8 is set to a predetermined strength. The predetermined strength is a strength that can be set by the transmission circuit 421, and is a transmission strength common to the sensor nodes 101. For example, a function stored in the storage device such as the disk 506 enables the calculation of distance between the sensor nodes 101 based on the reception strength. The monitoring server 100 substitutes the reception strength into the function to calculate the distance between the source of the measurement signals s8 and the source of the measurement result signal s9. For example, the monitoring server 100 calculates a loss in reception strength based on the reception strength, the transmission strength [dBm] of the measurement signals s8, a transmission antenna absolute gain [dBi] of the transmission circuit 421, and a reception antenna absolute gain [dBi] of the reception circuit 422. The monitoring server 100 substitutes the reception strength into a first function from which a loss in reception strength is obtained and thereby, calculates the loss in reception strength. From the first function, the loss in reception strength is obtained by subtracting the substituted reception strength from the total value of the transmission strength of the measurement signal s8, the transmission antenna absolute gain, and the reception antenna absolute gain. The transmission antenna absolute gain and the reception antenna absolute gain are values based on the antenna 409 and are fixed values and stored in advance in the storage unit 904. The monitoring server 100 substitutes the calculated loss in reception strength into a second function from which a distance between the sensor nodes 101 can be calculated and, thereby calculates a distance between the source of the measurement signal s8 and the sensor node 101 receiving the measurement signal s8. The second function is Equation (1) below. In Equation (1), L is a loss; d is a distance [m]; and λ is a wavelength [m]. The wavelength λ is a fixed value and stored in advance in the storage unit 904.

$$d = \frac{\lambda\sqrt{L}}{4\pi} \quad (1)$$

Therefore, the monitoring server 100 estimates the position of the sensor node 101-M by using a method such as trilateration based on the identified distance and the position indicated by the positional information of the source of the measurement signal s8. The monitoring server 100 stores the positional information indicating the estimated position of the sensor node 101-M into the storage unit 904. The monitoring server 100 defines the sensor node 101 at the newly ascertained position, such as the sensor node 101-M, as a reference point node (step S1507). The monitoring server 100 transmits the measurement signal output instruction signal s7 with the destination set to the reference point node (step S1508). Configuration may be such that the monitoring server 100 does not transmit the positional information to the reference point node at the newly ascertained position.

When receiving the measurement signal s8 output signal, the sensor node 101-1 transfers the measurement signal output instruction signal s7 (step S1509). Although the measurement signal output instruction signal s7 is depicted as being directly transmitted from the sensor node 101-1 to the destination, i.e., the sensor node 101-M, in the example of FIG. 15, the measurement signal output instruction signal s7 may be sent to the sensor node 101-M through relay transfer. When receiving the measurement signal s8 output signal, the sensor node 101-M broadcasts the measurement signal s8 at the predetermined strength (step S1510). The monitoring server 100 collects the positional information of the sensor nodes 101 in this way.

If the position of a node is still unknown, a position measurable range in the area is expanded by causing the sensor node 101 at the position newly ascertained as described above to transmit the measurement signal s8 for position, as a reference point node. When the positions of all the sensor nodes 101 are ascertained, the position measurement is terminated. If the measurement result signal s9 cannot be received even after the elapse of a certain time or more since the last transmission of the measurement signal output instruction signal s7, the monitoring server 100 terminates the position measurement. For example, even if the measurement result signal s9 cannot be received even after the elapse of a certain time or more, positions of some of the sensor nodes 101 may remain uncertain because it is only necessary to make the density of the eventually operated sensor nodes 101 uniform.

After the position measurement process, the monitoring server 100 executes a distribution density analysis process. If the position measurement is completed, the monitoring server 100 creates area information indicating divided areas a obtained by dividing an area simulating the arrangement area (area) into squares of a predetermined size. The predetermined size may be set by the developer of the system 300 and is determined based on a reachable distance according to the transmission strength of the signals transmitted from the sensor nodes 101.

Figure 16:
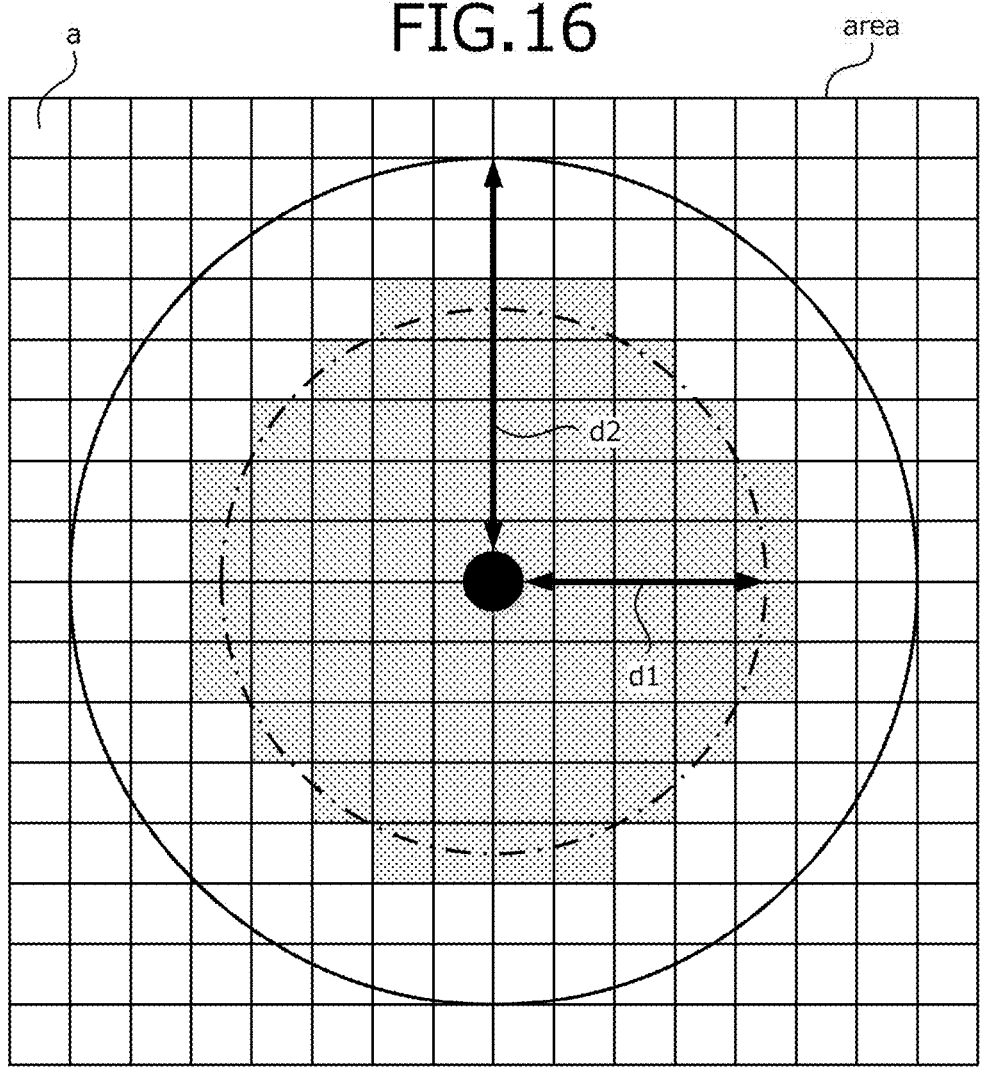
FIG. 16 is an explanatory diagram of a distribution density analysis example.

FIG. 16 is an explanatory diagram of a distribution density analysis example. FIG. 16 depicts the divided areas a obtained by dividing the arrangement area (area) like a mesh. A communicable area ca and the divided areas a depicted in FIG. 16 are areas on a simulation space of the monitoring server 100. The monitoring server 100 determines for each of the divided areas a indicated by the area information whether a sensor node 101 at least partially includes the divided area a in the measurement area sa thereof. The measurement area sa is an area that can be measured by the sensor 401. The measurement area sa is determined by the position of the sensor node 101 and a predetermined distance d1. As described above, the sensor 401 included in each of the sensor nodes 101 has a measurable area determined in advance. As described above, the predetermined distance d1 is a value determined in advance according to the type and performance of the sensor 401. For example, if it is determined that each of the divided areas a is at least partially included in the measurement area sa of a sensor node 101, the monitoring server 100 increases the density for the divided area a. An increased amount may be constant within the measurement area sa or may be dependent on a distance from the sensor node 101 such that, for example, the increased amount is made larger at a position closer to the sensor node 101. This may be made variable depending on characteristics of the mounted sensor 401. The distribution density in the arrangement area (area) is identified in this way. As depicted in FIG. 16, the measurement area sa is different from the communicable area ca. For example, the communicable area ca is determined by the position of the sensor node 101 and a predetermined distance d2. The predetermined distance d2 is determined by the signal transmission strength of the transmission circuit 421 and the performance of the reception circuit 422.

After the distribution density analysis process is terminated, the monitoring server 100 executes the density difference elimination process. For example, if the divided areas a include a divided area a having the density equal to or less than the threshold value th, the monitoring server 100 executes a thinning process since the prescribed number nn of the sensor nodes 101 are connected to the network SNET at the time of the provisional network SNET construction. After the thinning process, the monitoring server 100 executes a node addition process of connecting a redundant node rnd to the provisional network SNET.

In the thinning process, the monitoring server 100 disconnects a sensor node 101 that includes the divided area a that has the highest density of the divided areas a in the measurement area sa. First, the monitoring server 100 selects the divided area a having the highest density. Subsequently, for each of the sensor nodes 101 at least partially including the selected divided area a in the measurement area sa, the monitoring server 100 derives a density for each of the divided areas in the case of excluding the sensor node 101 from the network SNET. For example, the monitoring server 100 derives a density corresponding to the number of the connection nodes cnd at least partially including the divided area a in the measurement areas sa among the connection nodes cnd in the case of excluding the sensor node 101 from the network SNET. Based on the derived density, the monitoring server 100 determines a disconnection candidate among the sensor nodes 101 at least partially including the selected divided area a in the measurement areas sa. For example, if a divided area a is present that has a derived density that is larger than the threshold value th before excluding a certain sensor node 101 and the derived density becomes smaller than the threshold value th in the case of excluding the sensor node 101, the monitoring server 100 does not select the sensor node 101 as a disconnection candidate.

The monitoring server 100 also calculates a standardization effect value for each of the sensor nodes 101 the at least partially include the selected divided area a in the measurement areas sa. The standardization effect value is a value indicating to what extent the density of the selected divided area a approaches an average density by disconnecting the sensor node 101. The monitoring server 100 determines the sensor node 101 having the largest calculated standardization effect value to be a disconnection candidate.

The average density is a value obtained by dividing "the square measure of the measurable measurement area sa of the sensor 401×the prescribed number nn" by the square measure of the arrangement area (area). The prescribed number nn is the number of the sensor nodes 101 that can be included in the provision network SNET described above. The standardization effect value is a value obtained by subtracting the total variation of the divided areas a departing from the average density, from the total variation of the divided areas a approaching the average density, when the distribution density is recalculated on the assumption that a particular candidate sensor node 101 is disconnected based on a distribution density analysis result. Approaching the average density means that the difference from the average density becomes smaller, and departing from the average density means that the difference from the average density becomes larger. If the sensor node 101 is disconnected from the provisional network SNET, the density is reduced in the divided areas a around the selected divided area a and therefore, the standardization effect value is represented by Equation (2) below.

$$ev = \sum_i (|\sigma_{1i} - \sigma_a| - |\sigma_{2i} - \sigma_a|) \quad (2)$$

In this equation, $\sigma_{1i}$ is a density of an i-th divided area a before disconnection and $\sigma_{2i}$ is a density of the i-th divided area a after disconnection. $\sigma_a$ is the average density described above. As represented by Equation (2), the standardization effect value represents to what extent the density approaches the average density by disconnection, and is therefore a sum of values obtained by subtracting the absolute value of the difference of the density after disconnection and the average density, from the absolute value of the difference of the density before disconnection and the average density. However, if a divided area a is present for which the density becomes smaller than the threshold value th as a result of a disconnection of the candidate sensor node 101, the monitoring server 100 determines that the candidate sensor node 101 cannot be disconnected.

If no disconnectable sensor node 101 is present among the sensor nodes 101 having the selected divided area a as the measurement area sa, the monitoring server 100 newly selects a divided area a exclusive of the already selected divided areas a, from among the divided areas a. If no disconnectable sensor node 101 is present with respect to the divided areas a that have a density that is higher than the average density, the monitoring server 100 notifies the developer of an inability to equalize the arrangement area (area). A method of the notification is not particularly limited and may be, for example, output via the network SNET to the user terminal 302.

Among the candidate sensor nodes 101 without a divided area a having a density that becomes smaller than the threshold value th, the monitoring server 100 selects the candidate sensor node 101 that has the largest standardization effect value as the sensor node 101 to be disconnected. The monitoring server 100 transmits the disconnection instruction signal s12 with the destination set to the candidate sensor node 101 selected for disconnection.

Figure 17:
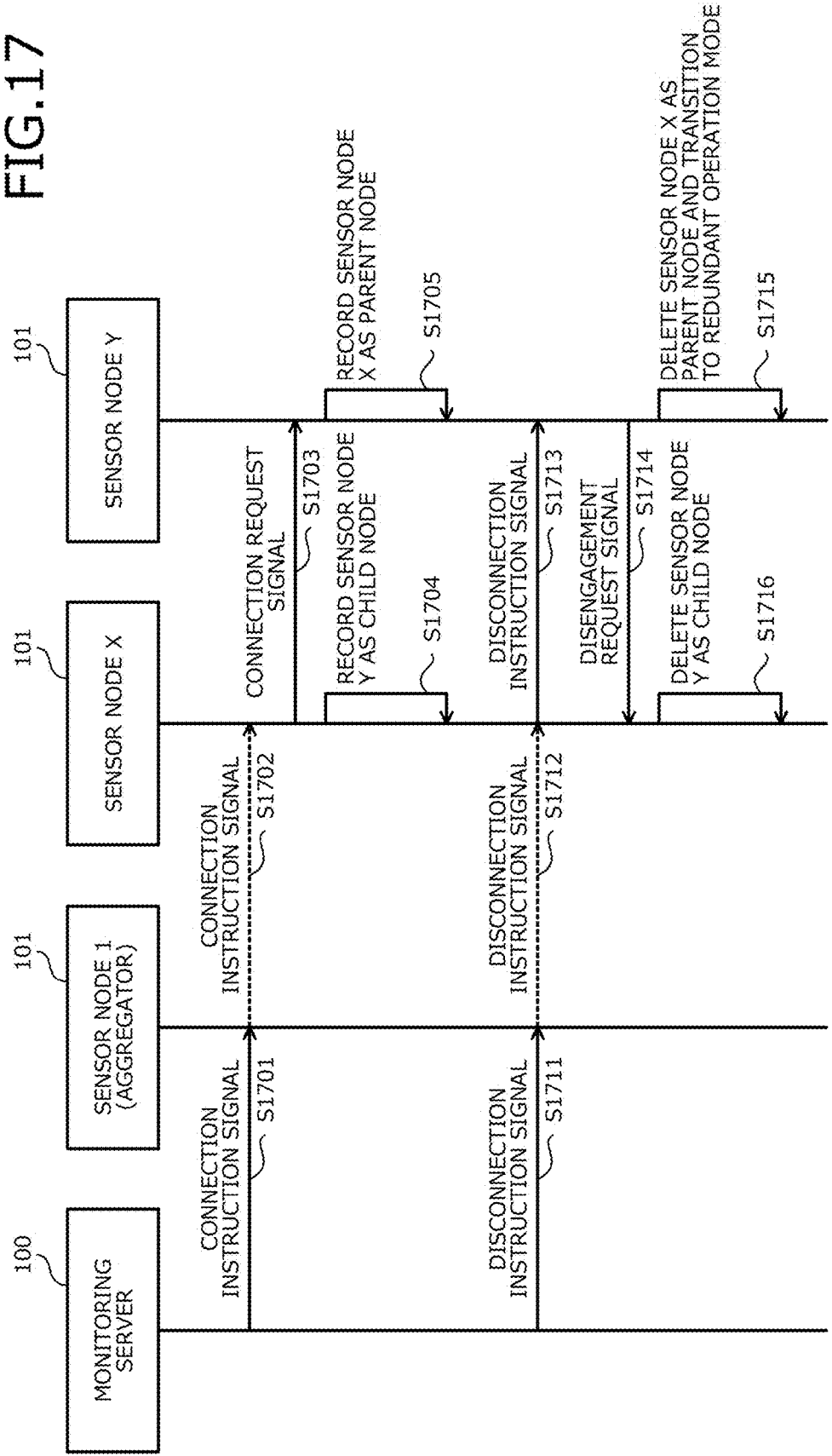
FIG. 17 is an explanatory diagram of an operation sequence example of connection/disconnection.

FIG. 17 is an explanatory diagram of an operation sequence example of connection/disconnection. A detailed example of the disconnection instruction is described at steps S1711 to S1716. FIG. 17 depicts an example of disconnecting a sensor node 101-Y that is a child node of the sensor node 101-X from the network SNET. The gateway 301 is omitted in this description.

For example, the monitoring server 100 defines the sensor node 101-Y to be subject to disconnection and transmits to the sensor node 101-1 acting as the aggregator ag, the disconnection instruction signal s12 with the destination set to the sensor node 101-Y (step S1711). When receiving the disconnection instruction signal s12, the sensor node 101-1 transfers the disconnection instruction signal s12 (step S1712). In the example depicted in FIG. 17, the disconnection instruction signal s12 is sent from the sensor node 101-1 to the sensor node 101-X through relay transfer. When receiving the disconnection instruction signal s12, the sensor node 101-X transfers the disconnection instruction signal s12 (step S1713). When receiving the disconnection instruction signal s12, the sensor node 101-Y transmits the disengagement request signal s13 to the sensor node 101-X that is the parent node (step S1714).

The sensor node 101-Y deletes the sensor node 101-X as the parent node and transitions to a redundant operation mode (step S1715). After transitioning to the redundant operation mode, the node no longer performs the measurement operation or the transfer operation. When receiving the disengagement request signal s13, the sensor node 101-X deletes the sensor node 101-Y as the child node (step S1716). As a result, the sensor node 101-Y can be disconnected from the network SNET.

After the thinning process is completed, the monitoring server 100 executes a node addition process of adding a sensor node 101 to the network SNET for a divided area a with a low density. Since it is unclear whether a sensor node 101 to be added exists, the monitoring server 100 cannot use a leveling effect value. Therefore, among the divided areas a, the monitoring server 100 selects the divided area a that has the smallest density as a candidate divided area a for the addition. The monitoring server 100 transmits the search instruction signal s1 with the destination set to the sensor nodes 101 that at least partially include the selected candidate divided area a in the measurement area sa. Alternatively, the monitoring server 100 transmits the search instruction signal s1 with the destination set to the sensor nodes 101 that at least partially include the selected candidate divided area a in the communicable area ca.

When receiving the search instruction signal s1 with the destination set to the sensor node 101, the sensor node 101 executes the search process. The search process has the same sequence as that described with reference to FIG. 13 and therefore, will not be described. When receiving the integrated search result signal s5, the monitoring server 100 determines whether a redundant node rnd without a past connection record is present near the destination of the search instruction signal s1. If it is determined that a redundant node rnd without a past connection record is present, the monitoring server 100 determines whether a child node can be connected. If the number of the child nodes held by the destination of the search instruction signal s1 is the maximum child node number mn, the monitoring server 100 determines that a child node cannot be connected. If the number of the child nodes held by the destination of the search instruction signal s1 is less than the maximum child node number mn, the monitoring server 100 determines that a child node can be connected. The monitoring server 100 transmits the connection instruction signal s10 with the destination set to the selected connection node cnd to one of the redundant nodes rnd without a past connection record.

In FIG. 17, a detailed example of the connection instruction is described at steps S1701 to S1705. FIG. 17 depicts an example of connecting the sensor node 101-Y as a child node of the sensor node 101-X.

The monitoring server 100 transmits the connection instruction signal s10 with the destination set to the sensor node 101-X to give an instruction for connection of the sensor node 101-Y (step S1701). When receiving the connection instruction signal s10, the sensor node 101-1 acting as the aggregator ag transfers the connection instruction signal s10 (step S1702). In the example depicted in FIG. 17, the connection instruction signal s10 is sent from the sensor node 101-1 to the sensor node 101-X through relay transfer. When receiving the connection instruction signal s10, the sensor node 101-X transmits the connection request signal s11 with the destination set to the sensor node 101-Y (step S1703). The sensor node 101-X records the sensor node 101-Y as the child node (step S1704). When receiving the connection request signal s11, the sensor node 101-Y records the sensor node 101-X as the parent node (step S1705). As a result, the sensor node 101 can be added to the network SNET.

As described above, if the number of the child nodes held by the destination of the search instruction signal s1 is the maximum child node number mn, the monitoring server 100 determines that a child node cannot be connected. In case of this determination, the monitoring server 100 may disconnect a child node already connected to the destination of the search instruction signal s1 and connect one of the redundant nodes rnd without a past connection record. However, if a divided area a is present that has a density that becomes the threshold value th or less if the already connected child node is disconnected, the monitoring server 100 does not perform the disconnection. If a sensor node 101 cannot be added to the network SNET because disconnection cannot be performed, the monitoring server 100 may notify the developer of information indicating an inability to make distribution uniform. For example, the monitoring server 100 may transmit to the user terminal 302, the information indicating the inability to make distribution uniform. The information indicating the inability to make distribution uniform may include information indicating which divided area a has a density equal to or less than the threshold value th. Alternatively, the information indicating the inability to make distribution uniform may include the densities for all the divided areas a.

Figure 18:
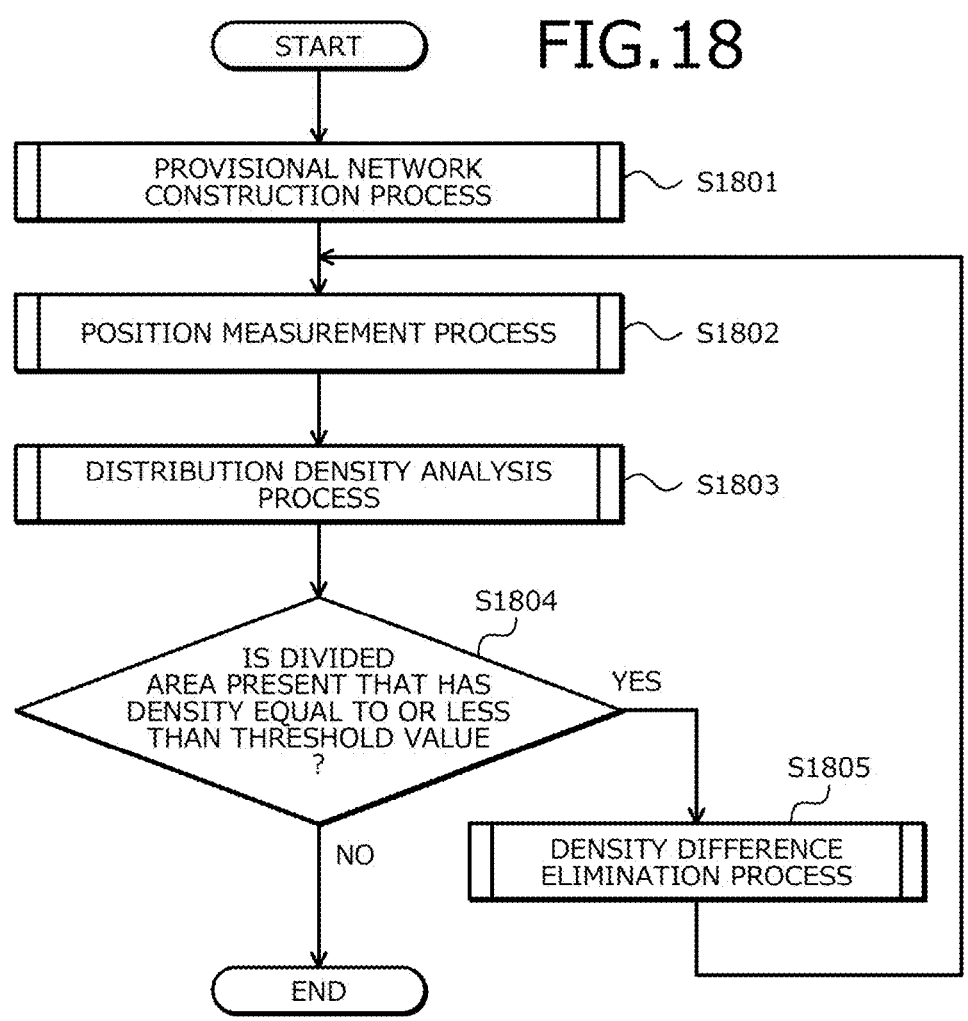
FIG. 18 is a flowchart of a communications network control process procedure example of the monitoring server 100.

FIG. 18 is a flowchart of a communications network control process procedure example of the monitoring server 100. The monitoring server 100 executes the provisional network construction process (step S1801). The monitoring server 100 executes the position measurement process (step S1802). The monitoring server 100 executes the distribution density analysis process (step S1803). The monitoring server 100 determines whether a divided area a is present that has a density equal to or less than the threshold value th (step S1804).

If a divided area a is present that has a density equal to or less than the threshold value th (step S1804: YES), the monitoring server 100 executes the density difference elimination process (step S1805) and returns to step S1802. If the divided area a is not present that has a density equal to or less than the threshold value th (step S1804: NO), the monitoring server 100 terminates a series of the operations. As a result, the operation of the constructed network SNET can be started.

Figure 19:
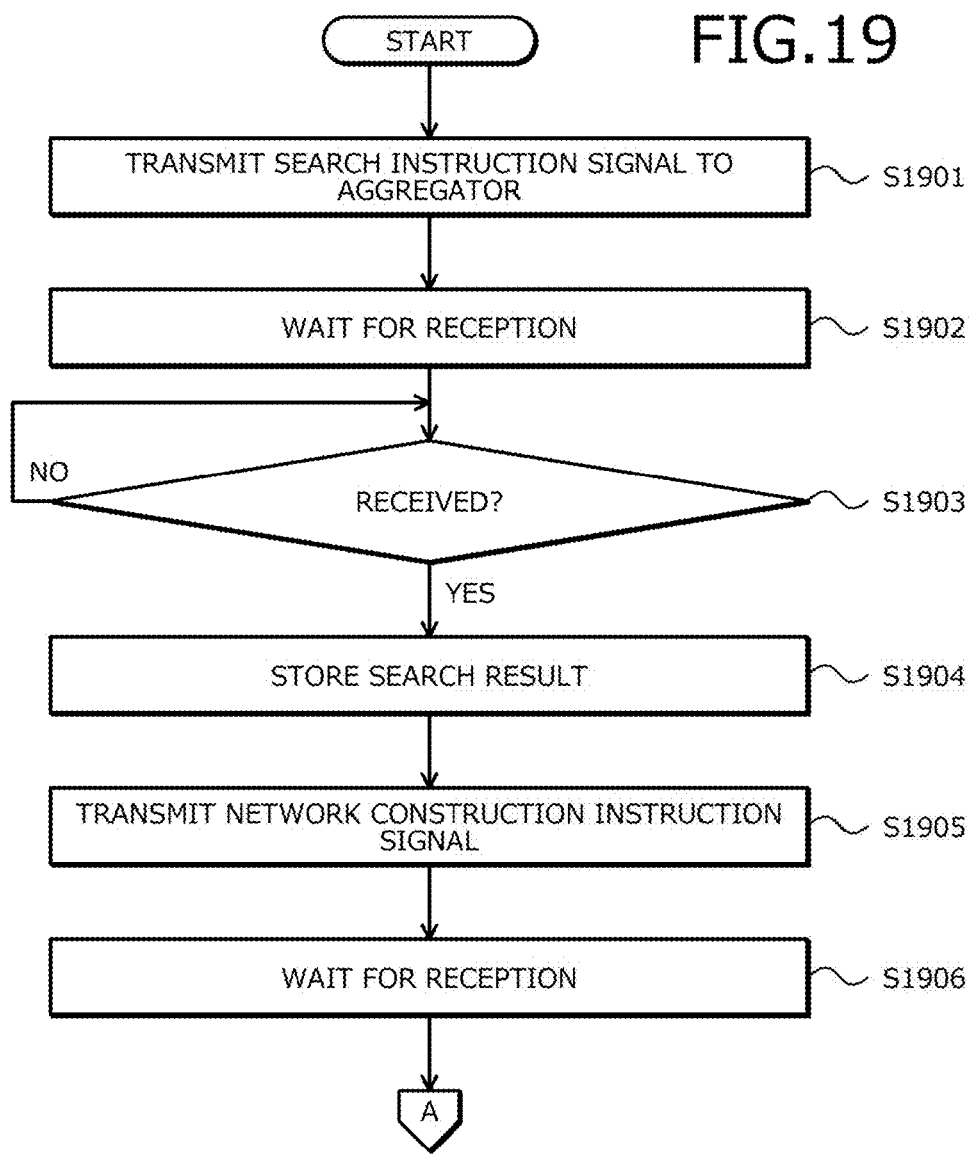
FIGS. 19 and 20 are flowcharts of an example of a provisional network construction process procedure of the monitoring server 100.
Figure 20:
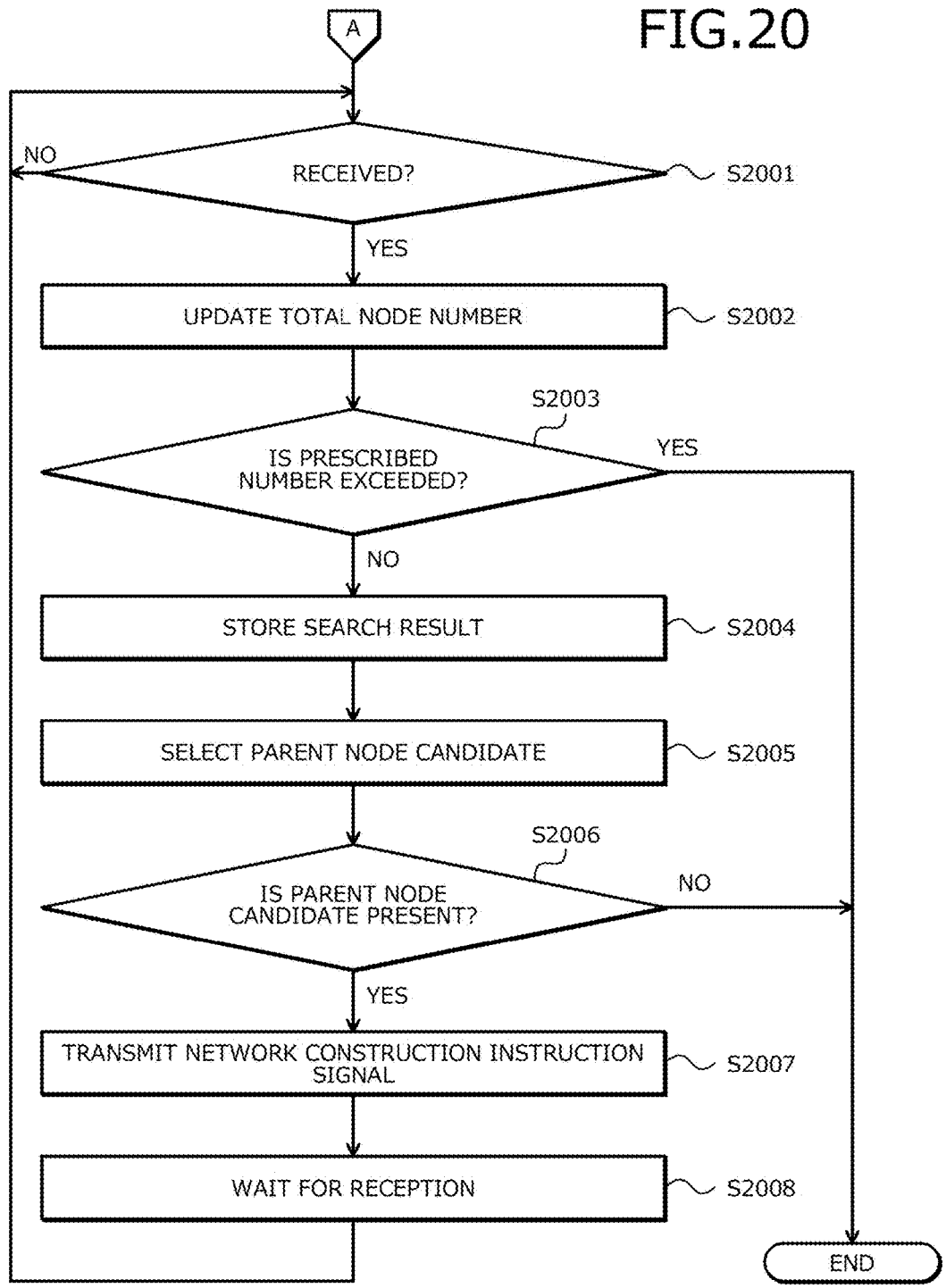
Figure 27:
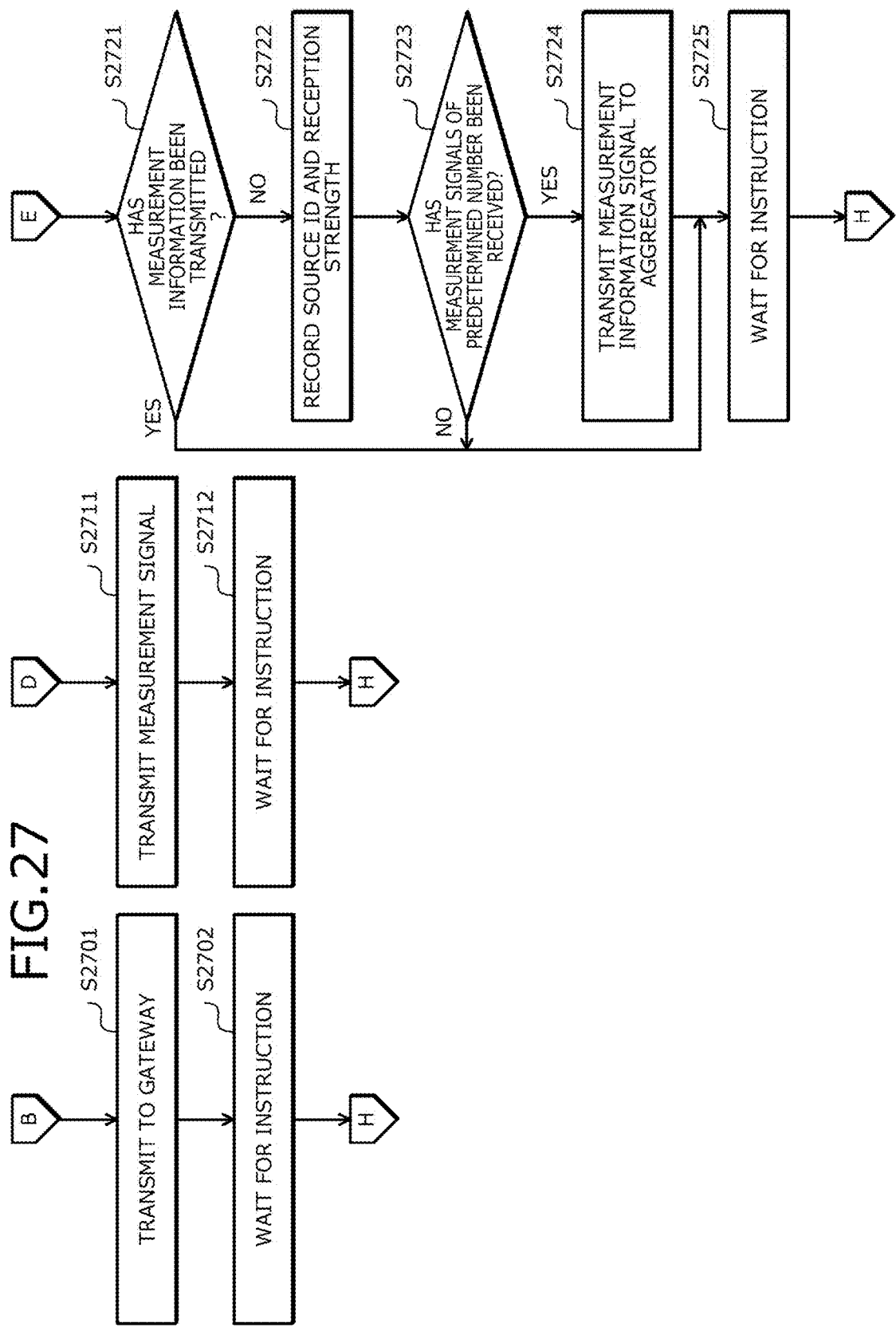
Figure 28:
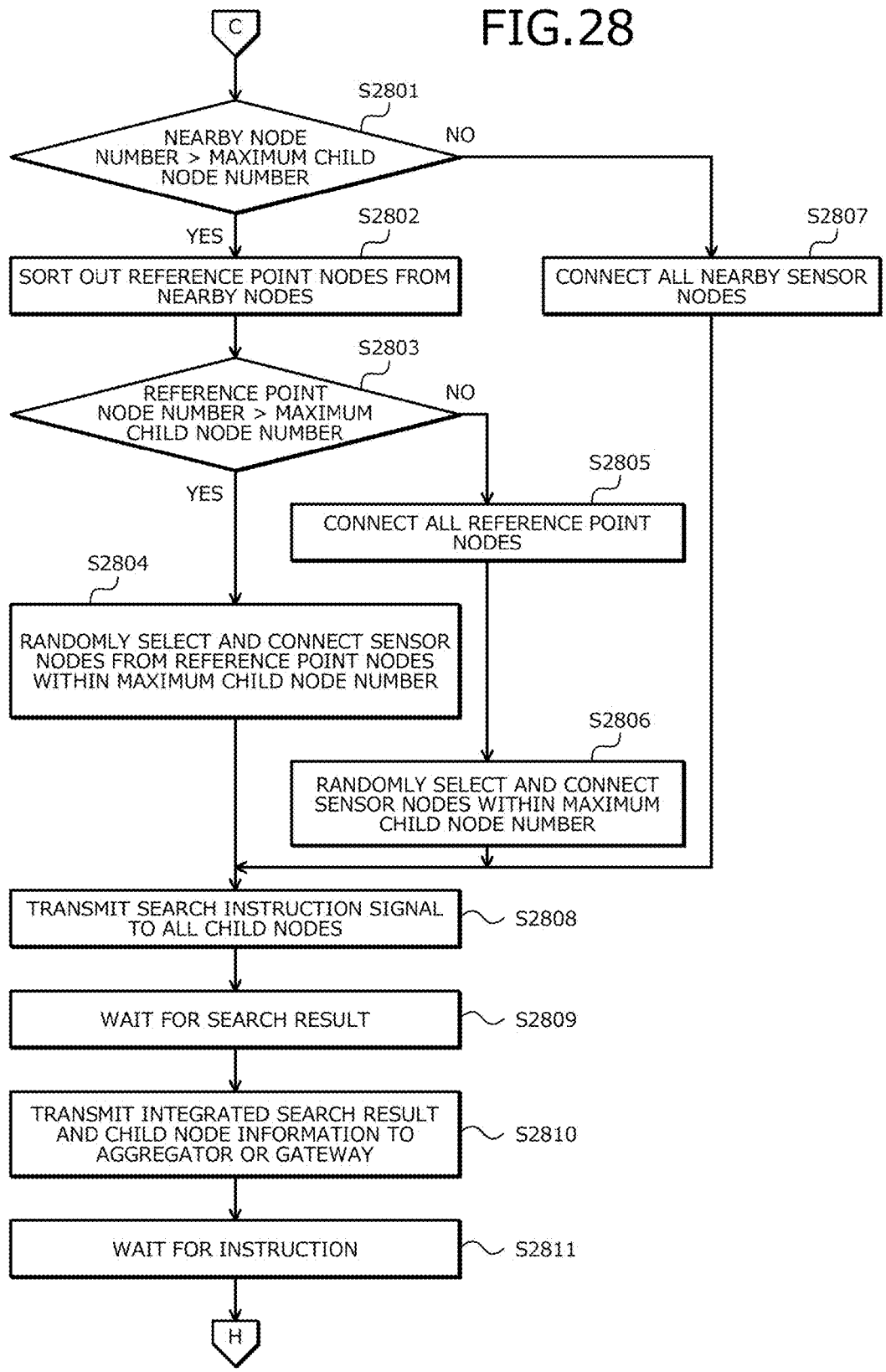

FIGS. 19 and 20 are flowcharts of an example of a provisional network construction process procedure of the monitoring server 100. The monitoring server 100 transmits the search instruction signal s1 to the aggregator ag (step S1901). The monitoring server 100 enters a reception waiting state (step S1902). The monitoring server 100 determines whether the search result signal s4 has been received (step S1903). If the search result signal s4 has not been received (step S1903: NO), the monitoring server 100 returns to step S1903. If the search result signal s4 has been received (step S1903: NO), the monitoring server 100 stores the search result (step S1904). The monitoring server 100 sets a record concerning the aggregator ag in the node management information 1001 based on the received search result. The monitoring server 100 transmits the network construction instruction signal s6 to the aggregator ag (step S1905). The monitoring server 100 enters the reception waiting state (step S1906).

The monitoring server 100 determines whether the integrated search result signal s5 is has been received in response to the network SNET construction instruction (step S2001). If the integrated search result signal s5 has not been received (step S2001: NO), the monitoring server 100 returns to step S2001. If the integrated search result signal s5 has been received (step S2001: YES), the monitoring server 100 updates the total node number (step S2002).

The monitoring server 100 determines whether the prescribed number nn is exceeded (step S2003). If the prescribed number nn is exceeded (step S2003: YES), the monitoring server 100 terminates a series of operations related to the provisional network construction process. If the prescribed number nn is not exceeded (step S2003: NO), the monitoring server 100 stores the search result (step S2004).

The monitoring server 100 selects a parent node candidate (step S2005). The monitoring server 100 determines whether a parent node candidate is present (step S2006). If a parent node candidate is not present (step S2006: NO), the monitoring server 100 terminates a series of operations related to the provisional network construction process.

If a parent node candidate is present (step S2006: YES), the monitoring server 100 transmits the network construction instruction signal s6 with the destination set to the parent node candidate (step S2007). The monitoring server 100 enters the reception waiting state (step S2008) and returns to step S2001. As described above, the operations at steps S2001 to S2007 are repeated to construct the provisional network SNET including the prescribed number nn of the sensor nodes 101.

FIG. 21 is a flowchart of an example of a position measurement process procedure of the monitoring server 100. The monitoring server 100 identifies from the search result, the reference point nodes connected to the provisional network SNET (step S2101). The monitoring server 100 transmits the measurement signal output instruction signal s7 with the destination set to all the reference point nodes (step S2102). The monitoring server 100 sets a time-out time in the timer 502 and enters the reception waiting state (step S2103). The monitoring server 100 determines whether a signal has been received (step S2104).

If it is determined that a signal has not been received (step S2104: NO), the monitoring server 100 determines whether the time has expired (step S2105). If the time has expired (step S2105: YES), the monitoring server 100 terminates a series of operations related to the position measurement process. If the time has not expired (step S2105: NO), the monitoring server 100 returns to step S2104.

If a signal has been received (step S2104: YES), the monitoring server 100 estimates the position of the source from the received measurement information signal and records the position (step S2106). The monitoring server 100 uses trilateration to estimate the position of the source of the measurement information signal, based on three combinations of the source and the reception strength of the measurement signal s8 included in the measurement information signal.

The monitoring server 100 determines whether a sensor node 101 of an unknown position is present (step S2107). The monitoring server 100 determines whether a position is unknown with respect to the sensor nodes 101 having records set in the node management information 1001. If it is determined that a sensor node 101 at an unknown position is not present (step S2107: NO), the monitoring server 100 terminates a series of operations related to the position measurement process.

If a sensor node 101 at an unknown position is present (step S2107: YES), the monitoring server 100 transmits the measurement signal output instruction signal s7 with the destination set to the source of the measurement information signal (step S2108) and returns to step S2103.

FIG. 22 is a flowchart of an example of a distribution density analysis process procedure of the monitoring server 100. The monitoring server 100 generates the divided area information 102 of the arrangement area (area) that is divided into the divided areas a (step S2201). The monitoring server 100 obtains the positional information indicating the positions of the connection nodes cnd included in the provisional network SNET (step S2202).

The monitoring server 100 determines whether an unselected connection node cnd is present among the connection nodes cnd whose position is already ascertained (step S2203). If an unselected connection node cnd is not present (step S2203: NO), the monitoring server 100 terminates a series of operations. If an unselected connection node cnd is present (step S2203: YES), the monitoring server 100 selects one connection node cnd from among the unselected connection nodes cnd (step S2204). The monitoring server 100 identifies the measurement area sa of the sensor included in the selected connection node cnd, based on the position of the selected connection node cnd and the predetermined distance (step S2205). The monitoring server 100 stores the measurement area information 103 indicating the identified measurement area sa into the storage unit 904.

The monitoring server 100 identifies among the divided areas a, a divided area a at least partially included in the identified measurement area sa (step S2206). The monitoring server 100 increases the density corresponding to the identified divided area a based on the identified divided area a and the selected connection node cnd (step S2207), and returns to step S2203.

FIG. 23 is a flowchart of a density difference elimination process procedure of the monitoring server 100. First, the monitoring server 100 executes the thinning process (step S2301). The monitoring server 100 executes the node addition process (step S2302) and terminates a series of operations related to the density difference elimination process. As described above, the monitoring server 100 can add the connection node cnd after thinning so as not to change the number of the sensor nodes 101 connected to the provisional network SNET.

FIG. 24 is a flowchart of an example of a thinning process procedure of the monitoring server 100. The monitoring server 100 selects the divided area a that has the largest density among the unselected divided areas a (step S2401). The monitoring server 100 determines whether a selectable divided area a is present (step S2402). If a selectable divided area a is present (step S2402: YES), the monitoring server 100 calculates the standardization effect value for a connection node cnd that at least partially includes the selected divided area a in the measurement area sa (step S2403). The monitoring server 100 determines whether a disconnectable connection node cnd is present (step S2404). If a disconnectable connection node cnd is not present (step S2404: NO), the monitoring server 100 returns to step S2402. If a disconnectable connection node cnd is present (step S2404: YES), the monitoring server 100 transmits the disconnection instruction signal s12 with the destination set to the connection node cnd that has the largest standardization effect value (step S2405), and terminates a series of operations related to the thinning process. If a selectable divided area a is not present (step S2402: NO), the monitoring server 100 gives notification of the inability to make distribution uniform (step S2406) and terminates all the processes due to the occurrence of an error.

FIG. 25 is a flowchart of an example a node addition process procedure of the monitoring server 100. The monitoring server 100 selects the divided area a that has the smallest density among the unselected divided areas a (step S2501). The monitoring server 100 identifies and selects a connection node cnd that at least partially includes the selected divided area a in the communicable area ca (step S2502). The monitoring server 100 determines whether a selectable connection node cnd is present (step S2503). If a selectable connection node cnd is present (step S2503: YES), the monitoring server 100 transmits the search instruction signal s1 to the selected connection node cnd (step S2504).

The monitoring server 100 determines whether a redundant node rnd without a past connection record is present nearby (step S2505). If a redundant node rnd without a past connection record is not present nearby (step S2505: NO), the monitoring server 100 returns to step S2503. On the other hand, if a redundant node rnd without a past connection record is present nearby (step S2505: YES), the monitoring server 100 determines whether a child node can be connected (step S2506). If a child node can be connected (step S2506: YES), the monitoring server 100 transmits the connection instruction signal s10 with the destination set to the one selected connection node cnd among the redundant nodes rnd without a past connection record (step S2507) and terminates a series of operations related to the node addition process. If a child node cannot be connected (step S2506: NO), the monitoring server 100 returns to step S2503.

If a selectable connection node cnd is not present (step S2503: NO), the monitoring server 100 determines whether a redundant node rnd without a past connection record has been found (step S2508). The information related to the presence of a past connection record may be stored in the storage unit 904. When the sensor node 101 is set as a child node of a node and is then disconnected from the network SNET, the monitoring server 100 correlates and stores to the storage unit 904, the identification information of the sensor node 101 and information indicating that the node has been set as a child node in a.

If a redundant node rnd without a past connection record has been found (step S2508: YES), the monitoring server 100 calculates, for each of the child nodes of the connection node cnd finding a redundant node rnd without a past connection record, the standardization effect value when the node is determined for disconnection (step S2509). The monitoring server 100 determines whether a disconnectable connection node cnd is present (step S2510). In this case, the monitoring server 100 determines a node for disconnection from among disconnection candidates without a divided area a having a density that becomes equal to or less than the threshold th if the disconnection candidate node is disconnected. Therefore, if no disconnection candidate without a divided area a having a density that becomes equal to or less than the threshold th is present, it is determined that no disconnectable connection node cnd is present.

If it is determined that a disconnectable connection node cnd is present (step S2510: YES), the monitoring server 100 transmits the disconnection instruction signal s12 with the destination set to the connection node cnd having the largest standardization effect value (step S2511) and goes to step S2507. If a redundant node rnd without a past connection record has not been found (step S2508: NO), the monitoring server 100 notifies the developer of the inability to make distribution uniform (step S2512) and terminates a series of operations due to an error. A method of the notification may include transmission of the information indicating the inability to make distribution uniform to the user terminal 302. If no disconnectable connection node cnd is present (step S2510: NO), the monitoring server 100 goes to step S2512.

FIGS. 26, 27, 28, and 29 are flowcharts of an example of the process procedure of the sensor node 101. The sensor node 101 is activated (step S2601) and put into a signal reception waiting state (step S2602). The sensor node 101 determines whether a signal has been received (step S2603).

If no signal has been received (step S2603: NO), the sensor node 101 returns to step 2603.

If it is determined at step S2603 that the search instruction signal s1 has been received (step S2603: SEARCH INSTRUCTION), the sensor node 101 searches for a nearby node (step S2604). The sensor node 101 transmits the search result signal s4 with the destination set to the parent node or the gateway 301 (step S2605) and returns to step S2602. The sensor node 101 capable of setting the destination to the gateway 301 is only the aggregator ag.

If it is determined at step S2603 that the integrated search result signal s5 has been received (step S2603: INTEGRATED SEARCH RESULT), the sensor node 101 transmits a received integrated search result to the gateway 301 (step S2701). The sensor node 101 enters an instruction reception waiting state (step S2702) and returns to step S2603.

If it is determined at step S2603 that the measurement signal output instruction signal s7 has been received (step S2603: MEASUREMENT SIGNAL OUTPUT INSTRUCTION), the sensor node 101 transmits the measurement signal s8 (step S2711). The sensor node 101 enters an instruction reception waiting state (step S2712) and returns to step S2603. If it is determined that the measurement signal s8 has been received (step S2603: MEASUREMENT), the sensor node 101 determines whether measurement information has been transmitted (step S2721). If position measurement is already completed, it is determined that measurement information has been transmitted.

If measurement information has been transmitted (step S2721: YES), the sensor node 101 goes to step S2725. If measurement information has not been transmitted (step S2721: NO), the sensor node 101 records the source ID and the reception strength (step S2722). The sensor node 101 determines whether the measurement signals s8 of a predetermined number has been received from different sources (step S2723). The predetermined number is a value defined in advance, for example, and if the arrangement area (area) is a planar surface as described above, the predetermined number may be three.

If signals of the predetermined number have not been received (step S2723: NO), the sensor node 101 goes to step S2725. If signals of the predetermined number have been received (step S2723: YES), the sensor node 101 transmits to the aggregator ag, a measurement information signal that includes the recorded measurement information (step S2724). The sensor node 101 enters an instruction reception waiting state (step S2725) and returns to step S2603.

If it is determined that the network construction instruction signal s6 has been received (step S2603: NETWORK CONSTRUCTION INSTRUCTION), the sensor node 101 determines whether the nearby node number>the maximum child node number mn is satisfied (step S2801). If the nearby node number>the maximum child node number mn is satisfied (step S2801: YES), the sensor node 101 sorts out the reference point nodes from the nearby nodes (step S2802).

The sensor node 101 determines whether the reference point node number>the maximum child node number mn is satisfied (step S2803). If the reference point node number>the maximum child node number mn is satisfied (step S2803: YES), the sensor node 101 randomly selects and connects the sensor nodes 101 from the reference point nodes within the maximum child node number mn (step S2804). The sensor node 101 transmits the search instruction signal s1 to all the child nodes (step S2808). The sensor node 101 enters a search result reception waiting state for the transmitted search instruction signal s1 (step S2809).

When receiving the search result signal s4, the sensor node 101 transmits an integrated search result and child node information to the aggregator ag or the gateway 301 (step S2810). The sensor node 101 enters an instruction reception waiting state (step S2811) and returns to step S2603.

If it is determined at step S2803 that the reference point node number>the maximum child node number mn is not satisfied (step S2803: NO), the sensor node 101 connects all the reference point nodes (step S2805). The sensor node 101 randomly selects and connects the sensor nodes 101 within the maximum child node number mn (step S2806) and goes to step S2808.

If it is determined at step S2801 that the nearby node number>the maximum child node number mn is not satisfied (step S2801: NO), the sensor node 101 connects all the nearby sensor nodes 101 (step S2807) and goes to step S2808.

If it is determined at step S2603 that the connection instruction signal s10 has been received (step S2603: CONNECTION INSTRUCTION), the sensor node 101 outputs the sensor node 101 indicated by the connection instruction signal s10 as a child node (step S2901). The sensor node 101 enters a reception waiting state (step S2902) and returns to step S2603.

If it is determined at step S2603 that the disconnection instruction signal s12 has been received (step S2603: DISCONNECTION INSTRUCTION), the sensor node 101 transmits the disengagement request signal s13 to the parent node (step S2911). The sensor node 101 transitions to a redundant operation mode (step S2912). The sensor node 101 enters a reception waiting state (step S2913) and returns to step S2603.

As described above, the monitoring server 100 analyzes each of the divided areas of the arrangement area in terms of the number of the network SNET connection nodes that at least partially include the divided area in the measurement areas and changes the network connection nodes according to the analysis result. As a result, the distribution of the redundant nodes can be made uniform and the reliability can be improved.

The monitoring server 100 provides the control of adding to the network the redundant node at least partially including the divided area selected based on the density corresponding to the number of the connection nodes in the measurement area of the sensor. For example, the monitoring server 100 transmits a signal giving an instruction for joining the network, to the communications node that at least partially includes the selected divided area in the measurement area of the sensor included in the sensor node. As a result, the distribution of the connection nodes can be made uniform and the arrangement area can evenly be measured.

The selected divided area is the divided area having the smallest value corresponding to the number of the connection nodes. This enables measurement of an area less likely to be measured by the sensor nodes.

The monitoring server 100 identifies among multiple construction nodes, a construction node that at least partially includes the selected divided area in the communicable area and provides control such that a node near the identified construction node is added to the network.

Among the multiple construction nodes, the monitoring server 100 excludes from the network, the construction node selected from the construction nodes that at least partially include the selected divided area in the measurement area. The selected divided area is the divided area having the largest derived value among the divided areas. For example, the monitoring server 100 transmits to the selected construction node, a signal giving an instruction for exclusion from the network. As a result, the redundant nodes can be disposed evenly in the arrangement area.

When determining a node for disconnection from among the construction nodes that at least partially include the selected divided area in the measurement area, the monitoring server 100 derives a density for each of the divided areas based on cases where each of the construction nodes is respectively disconnected. The monitoring server 100 determines a node for disconnection based on the derived densities.

The monitoring server 100 provides control of adding a redundant node to the network after a construction node is excluded from the network. As a result, since the number of excluded nodes becomes identical to the number of added nodes, the number of the construction nodes in the network can be made constant. Therefore, the number of the reduction nodes can be prevented from becoming too small or too large and long-term reliability can be improved.

If no divided area of the multiple divided areas has a derived density that does not satisfy the predetermined condition, the monitoring server 100 does not execute the process of providing control to make changes. The monitoring server 100 executes the process of providing control of making changes only when one of the multiple divided areas has a derived density that does not satisfy the predetermined condition. As a result, the network is changed only when the redundant nodes are not evenly disposed in the arrangement area.

The monitoring server 100 transmits to a construction node whose position is already ascertained among the construction nodes, a signal giving instruction for outputting a measurement signal to nearby nodes. From a construction node receiving a predetermined number of the measurement signals from the already ascertained construction nodes, the monitoring server 100 receives a predetermined number of combinations of the reception strength of the measurement signal and the source of the measurement signal. Based on the predetermined number of combinations and the positions of the already ascertained construction nodes, the monitoring server 100 identifies the position of the construction node. As a result, even though not all the positions of the sensor nodes are ascertained in advance, the positions of the sensor nodes included in the network can be identified and the arrangement area of the sensor nodes can be identified. Therefore, since GPS units need not be mounted on all the sensor nodes, cost of the system can be reduced.

Since not all the sensor nodes are included in the network, the amount of information related to the sensor nodes included in the network for management by the monitoring server 100 can be reduced.

The communications network control method described in this embodiment can be implemented by executing a prepared communications network control program on a computer such as a personal computer and a workstation. This communications network control program is recorded on a computer-readable recording medium such as a magnetic disk, an optical disk, and a universal serial bus (USB) flash memory and is read from the recording medium and executed by the computer. The communications network control program may be distributed through the network NET such as the Internet.

According to an aspect of the present invention, reliability can be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communications network control method comprising:
    obtaining, by a computer, measurement area information indicating a measurement area of a sensor included in a communications node, the computer obtaining the measurement area information for each communications node in a communications node group that is included in a communications network and that is among a plurality of communications nodes arranged in an arrangement area;
    obtaining, by the computer, divided area information indicating a plurality of divided areas obtained by dividing the arrangement area;
    deriving, by the computer and for each divided area among the plurality of divided areas indicated by the obtained divided area information, a first value corresponding to a count of communications nodes that are in the communications node group and at least partially include the divided area in the measurement area indicated by the obtained measurement area information; and
    providing, by the computer, control of changing among the plurality of communications nodes, the communications nodes included in the communications network, according to the first value derived for the each divided area among the plurality of divided areas.

2. The communications network control method according to claim 1, wherein
    the providing control includes adding to the communications network, a communications node among the plurality of the communications nodes excluding the communications nodes group, the communications node at least partially including in the measurement area of the sensor included in the communications node, a divided area selected from among the plurality of divided areas based on the first value derived for each divided area among the plurality of divided areas.

3. The communications network control method according to claim 2, wherein
    the providing control includes transmitting to the communications node that at least partially includes the selected divided area in the measurement area of the sensor included in the communications node, a signal giving an instruction to join the communications network.

4. The communications network control method according to claim 2, wherein
    the selected divided area is a divided area for which the first value derived is smallest among the plurality of divided areas.

5. The communications network control method according to claim 2, further comprising:
    obtaining, by the computer and for each communications node in the communications node group, communicable area information indicating a communicable area of the communications node;
    identifying, by the computer, a first communications node that among the communications node group, at least partially includes the selected divided area in the communicable area indicated by the obtained communicable area information; and
    searching, by the computer, for a second communications node that among the plurality of the communications nodes excluding the communications nodes group, is directly accessible by the identified first communications node, wherein
    the providing control includes adding the second communications node to the communications network.

6. The communications network control method according to claim 5, wherein
    the selected divided area is a divided area for which the first value derived is largest among the plurality of divided areas.

7. The communications network control method according to claim 1, wherein
    the providing control includes excluding from the communications network, a communications node that is selected from among the communications nodes that are in the communications node group and at least partially include in the measurement area, a divided area selected from the plurality of divided areas based on the first value derived for each divided area among the plurality of divided areas.

8. The communications network control method according to claim 7, wherein
    the providing control includes transmitting to the selected communications node, a signal instructing exclusion from the communications network.

9. The communications network control method according to claim 7, further comprising
    deriving, by the computer, for each divided area among the plurality of divided areas and with respect to each of the communications nodes that are in the communications node group and at least partially include the selected divided area in the measurement area, a second value corresponding to a count of the communications nodes that are in the communications network and at least partially include the divided area in the measurement area, when a communications node that is in the communications node group and at least partially includes the selected divided area is excluded from the communications network, wherein
    the selected communications node is a communications node selected from the communications nodes that at least partially include the selected divided area in the measurement area, based on the second value derived with respect to each of the communications nodes that at least partially include the selected divided area in the measurement area.

10. The communications network control method according to claim 7, wherein
    the providing control includes adding to the communications network, after excluding the selected communications node from the communications network, a communications node that among the plurality of the communications nodes excluding the communications nodes group, at least partially includes in the measurement area of the sensor included in the communications node, the divided area selected from among the plurality of divided areas based on the first value derived for each divided area among the plurality of divided areas.

11. The communications network control method according to claim 1, further comprising refraining, by the computer, to provide control when the first value derived for each of the divided areas among the plurality of divided areas satisfies a predetermined condition, wherein the providing control is performed when the first value derived for a divided area among the plurality of divided areas fails to satisfy the predetermined condition.

12. The communications network control method according to claim 1, further comprising:

transmitting, by the computer, to a first communications node among the plurality of communications nodes and for which a position has been ascertained, a first signal instructing the first communications node to transmit a signal of a predetermined strength;

receiving, by the computer, a second signal transmitted from a second communications node receiving the first signal transmitted from at least a predetermined number of the first communications nodes of the communications node group, the second signal includes corresponding to the predetermined number, combinations of reception strength of the first signal and identification information of a source of the first signal; and identifying, by the computer, the position of the second communications node based on the predetermined number of combinations, wherein the obtaining the measurement area information includes identifying the measurement area of the sensor included in the second communications node by the identified position so as to obtain the measurement area information indicating the measurement area identified for the second communications node.

13. A non-transitory, computer-readable recording medium storing therein a communications control program that causes a computer to execute a process comprising:

obtaining, by a computer, measurement area information indicating a measurement area of a sensor included in a communications node, the computer obtaining the measurement area information for each communications node in a communications node group that is included in a communications network and that is among a plurality of communications nodes arranged in an arrangement area;

obtaining, by the computer, divided area information indicating a plurality of divided areas obtained by dividing the arrangement area;

deriving, by the computer and for each divided area among the plurality of divided areas indicated by the obtained divided area information, a first value corresponding to a count of communications nodes that are in the communications node group and at least partially include the divided area in the measurement area indicated by the obtained measurement area information; and providing, by the computer, control of changing among the plurality of communications nodes, the communications nodes included in the communications network, according to the first value derived for the each divided area among the plurality of divided areas.

14. A system comprising:

a communications apparatus; and a plurality of communications nodes arranged in an arrangement area, wherein the communications apparatus obtains for each communications node in a communications node group that is included in a communications network and that is among the plurality of communications nodes, measurement area information indicating a measurement area of a sensor included in the communications node, the communications apparatus obtains divided area information indicating a plurality of divided areas obtained by dividing the arrangement area, the communications apparatus derives for each of the plurality of divided areas indicated by the obtained divided area information, a value corresponding to a count of communications nodes that are in the communications node group and at least partially include the divided area in the measurement area indicated by the obtained measurement area, and the communications apparatus provides control of changing among the plurality of communications nodes, the communications nodes included in the communications network, according to the value derived for the each divided area among the plurality of divided areas.

* * * * *